US012670727B2

(12) United States Patent
 Zhao et al.

(10) Patent No.:  US 12,670,727 B2
(45) Date of Patent:       Jun. 30, 2026

(54) PATH MARKING DETECTION AND CLASSIFICATION

(71) Applicant: NVIDIA Corporation, Santa Clara, CA (US)

(72) Inventors: Ruiqi Zhao, Shanghai (CN); Jonathan Edward Barker, Boulder, CO (US); Tommi Koivisto, Espoo (FI); Yu Zhang, Sunnyvale, CA (US); Shuang Wu, Fremont, CA (US); Yixuan Lin, San Jose, CA (US); Ge Cong, Pleasanton, CA (US); Andrew Tao, Los Altos, CA (US); Kezhao Chen, Beijing (CN)

(73) Assignee: NVIDIA Corporation, Santa Clara, CA (US)

( * ) Notice: Subject to any disclaimer, the term of this patent is extended or adjusted under 35 U.S.C. 154(b) by 335 days.

(21) Appl. No.: 18/459,802

(22) Filed: Sep. 1, 2023

(65) Prior Publication Data

US 2025/0078532 A1     Mar. 6, 2025

(51) Int. Cl.
 *G06V 20/56*        (2022.01)
 *G01S 17/89*        (2020.01)
 *G06V 10/764*       (2022.01)
 *G06V 10/77*        (2022.01)
 *G06V 10/774*       (2022.01)

(52) U.S. Cl.
 CPC ............ *G06V 20/588* (2022.01); *G01S 17/89* (2013.01); *G06V 10/764* (2022.01); *G06V 10/7715* (2022.01); *G06V 10/774* (2022.01)

(58) Field of Classification Search
 None
 See application file for complete search history.

(56)                References Cited

U.S. PATENT DOCUMENTS 10,859,395 B2    12/2020  Wheeler et al.
10,885,698 B2     1/2021  Muthler et al.
                (Continued)

OTHER PUBLICATIONS

Fusing Geometrical and Visual Information via Superpoints for the Semantic Segmentation of 3D Road Scenes (Year: 2002).*
                (Continued)

*Primary Examiner* — Chan S Park

(74) *Attorney, Agent, or Firm* — Shook, Hardy & Bacon L.L.P.

(57)                ABSTRACT

In various examples, multimodal image data may be used to generate a set of top-down tile images, which are applied to a deep neural network generator architecture model to produce lane marking-specific heatmap images corresponding to the set of top-down tile images. The multimodal sensor data may include LIDAR-captured intensity channel data, LIDAR-captured feature height channel data, and optical color image channel data. The set of top-down tile images may be processed by the generator model to automatically detect lane boundaries and navigation boundaries to generate pixel-level heatmap images that may classify lane markings by marking characteristics such as line type and/or color. The generator model may comprise an encoder-decoder architecture, with multiscale feature extraction and/or context extraction functional layers intervening between the encoder model and the decoder model.

20 Claims, 12 Drawing Sheets

(56) References Cited

U.S. PATENT DOCUMENTS

| | | | | |
|---|---|---|---|---|
| 11,107,228 | B1 * | 8/2021 | Shrivastava | G06T 11/00 |
| 12,372,370 | B2 * | 7/2025 | Han | G01C 21/3815 |
| 2021/0089845 | A1 * | 3/2021 | Galeev | G06N 3/045 |
| 2021/0097309 | A1 * | 4/2021 | Kaku | B60K 35/20 |
| 2025/0010854 | A1 * | 1/2025 | Cheng | G06V 10/764 |

OTHER PUBLICATIONS

Draelos, R., "Learn to Pay Attention! Trainable Visual Attention in CNNs", Towards Data Science, pp. 1-23 (Aug. 10, 2019).

Tao, A., and Sapra, K., "Using Multi-Scale Attention for Semantic Segmention", Developer, Technical Blog, Computer Vision/Video Analytics, pp. 1-8 (Jun. 12, 2020).

Mao, X., et al., "Least Squares Generative Adversarial Networks", In Proceedings of the IEEE International Conference on Computer Vision (ICCV), pp. 2794-2802 (2017).

Siarohin, A., et al., "Animating Arbitrary Objects via Deep Motion Transfer", In Proceedings of the IEEE/CVF Conference on Computer Vision and Pattern Recognition (CVPR), pp. 2377-2386 (2019).

Isola, P., et al., "Image-to-Image Translation with Conditional Adversarial Networks", In Proceedings of the IEEE Conference on Computer Vision and Pattern Recognition (CVPR), pp. 1125-1134 (2017).

Bello, I., "Lambdanetworks: Modeling Long-Range Interactions Without Attention", ICLR, arXiv:2102.08602v1, pp. 1-31 (Feb. 17, 2021).

Sun, K., et al., "High-Resolution Representations for Labeling Pixels and Regions", arXiv:1904.04514v1, pp. 1-13 (Apr. 9, 2019).

Singh, N., "Paper Explained-LambdaNetworks: Modeling long Range Interactions without Attention", Analytics Vidhya, pp. 1-17 (Oct. 24, 2020).

Ghafoorian, M., et al., "EL-GAN: Embedding Loss Driven Generative Adversarial Networks for Lane Detection", In Proceedings of the European Conference on Computer Vision (ECCV) Workshops, pp. 1-17 (2018).

Schreiber, M., et al., "Detecting Symbols on Road Surface for Mapping and Localization using OCR", In Proceedings of the IEEE International Conference on Intelligent Transportation Systems, pp. 597-602 (2014).

Mamun, A., A., et al., "A Comprehensive Review on Lane Marking Detection Using Deep Neural Networks", Sensors, MDPI, pp. 1-22 (2022).

Ghallabi, F., et al., "LIDAR-Based Lane Marking Detection For Vehicle Positioning in an HD Map", HAL open science, 21st International Conference on Intelligent Transportation Systems (ITSC), pp. 1-7 (Oct. 9, 2018).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

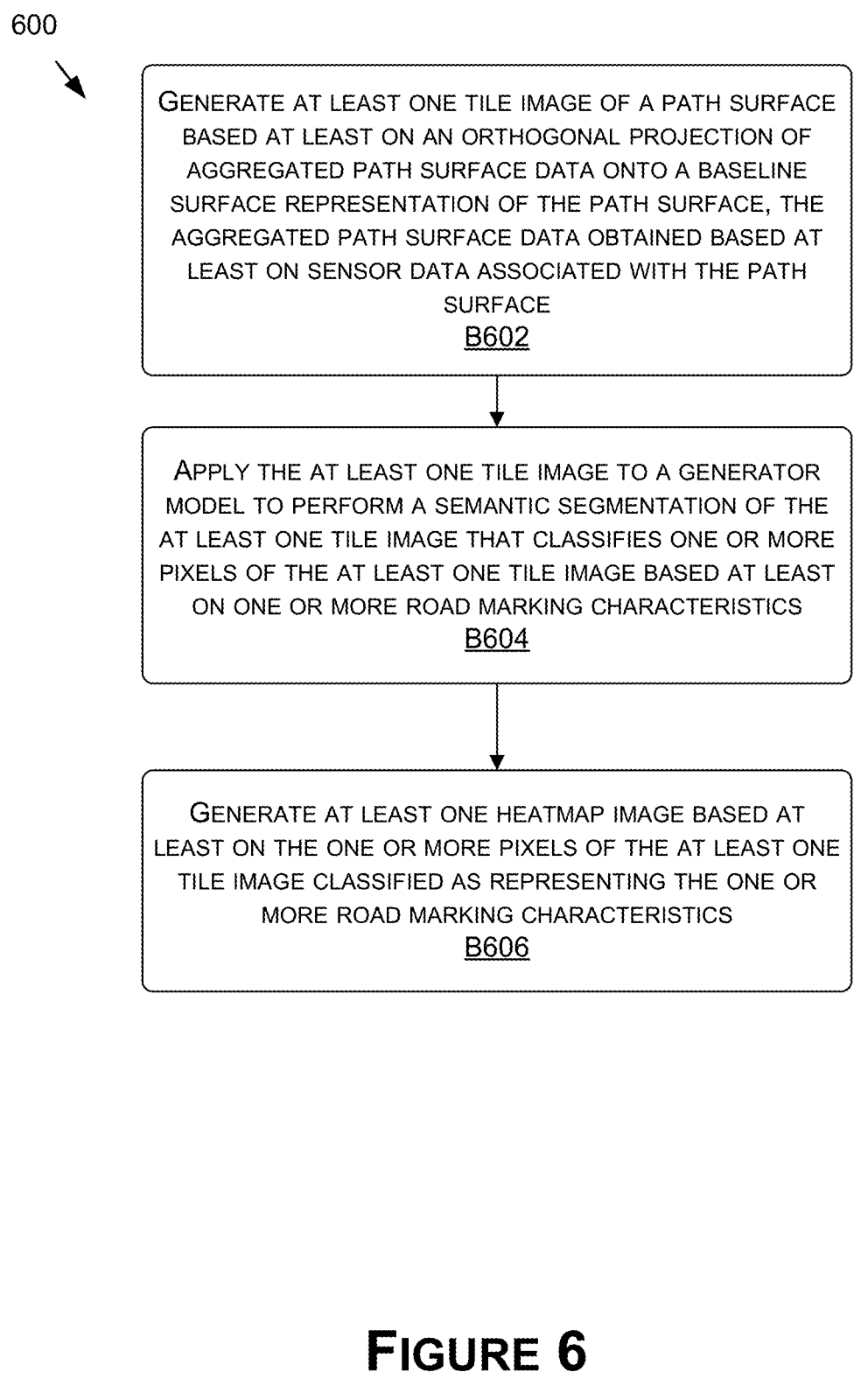

600

GENERATE AT LEAST ONE TILE IMAGE OF A PATH SURFACE BASED AT LEAST ON AN ORTHOGONAL PROJECTION OF AGGREGATED PATH SURFACE DATA ONTO A BASELINE SURFACE REPRESENTATION OF THE PATH SURFACE, THE AGGREGATED PATH SURFACE DATA OBTAINED BASED AT LEAST ON SENSOR DATA ASSOCIATED WITH THE PATH SURFACE
B602

APPLY THE AT LEAST ONE TILE IMAGE TO A GENERATOR MODEL TO PERFORM A SEMANTIC SEGMENTATION OF THE AT LEAST ONE TILE IMAGE THAT CLASSIFIES ONE OR MORE PIXELS OF THE AT LEAST ONE TILE IMAGE BASED AT LEAST ON ONE OR MORE ROAD MARKING CHARACTERISTICS
B604

GENERATE AT LEAST ONE HEATMAP IMAGE BASED AT LEAST ON THE ONE OR MORE PIXELS OF THE AT LEAST ONE TILE IMAGE CLASSIFIED AS REPRESENTING THE ONE OR MORE ROAD MARKING CHARACTERISTICS
B606

FIGURE 6

SERVER(S) 778

CPU 780(B)

PCIe SWITCH 782(D)

PCIe SWITCH 782(C)

GPU 784(F)

GPU 784(H)

GPU 784(E)

GPU 784(G)

786

PCIe SWITCH 782(B)

CPU 780(A)

PCIe SWITCH 782(A)

GPU 784(B)

GPU 784(D)

788

GPU 784(A)

GPU 784(C)

NETWORK(S) 790

792

794

700

776

900

PATH MARKING DETECTION AND CLASSIFICATION

BACKGROUND

Advanced Driver Assistance Systems (ADASs) represent an evolving technology in the automotive industry to provide features such as lane centering, lane departure detection, adaptive lane change, adaptive cruise control, among others. To a substantial degree, these ADAS features rely on real-time or near real-time lane marking detection and recognition techniques to extract lane features and understand the structural features of lane markings that define lane boundaries. Lane marking detection and recognition also plays a significant role in generating high-definition (HD) maps of roads and highways. HD maps may be used for navigation and localization applications, for example, by autonomous or semi-autonomous vehicles. However, accurate lane marking recognition remains challenging due to factors such as poor lighting, poor road conditions, deteriorated lane markings, road repairs, and/or obstructions that interfere with capturing lane marking data.

SUMMARY

Embodiments of the present disclosure relate to point cloud-based heatmap generation for path surface lane marking detection and classification. Systems and methods are disclosed that detect and classify lane markings from road surfaces for use in generating maps and/or for other applications.

In contrast to these traditional systems for lane marking detection, one or more of the embodiments described herein use multimodal sensor data (e.g., a combination of camera and LIDAR data) to generate a set of top-down tile images and apply that set of top-down tile images to a deep neural network (DNN) generator architecture model to produce lane-marking specific heatmap images corresponding to the set of top-down tile images. The multimodal sensor data may include LIDAR-captured intensity channel data, LIDAR-captured feature height channel data, and optical color image channel data. The set of top-down tile images may be processed by the generator model to automatically detect lane boundaries and navigation boundaries to generate pixel-level heatmap images that may classify lane markings by marking characteristics such as line type and/or color.

BRIEF DESCRIPTION OF THE DRAWINGS

The present systems and methods for point cloud-based heatmap generation for path surface lane marking detection and classification are described in detail below with reference to the attached drawing figures, wherein:

FIG. 6 is a flow diagram for a method for path surface lane marking detection, in accordance with some embodiments of the present disclosure;

DETAILED DESCRIPTION

Figure 1:
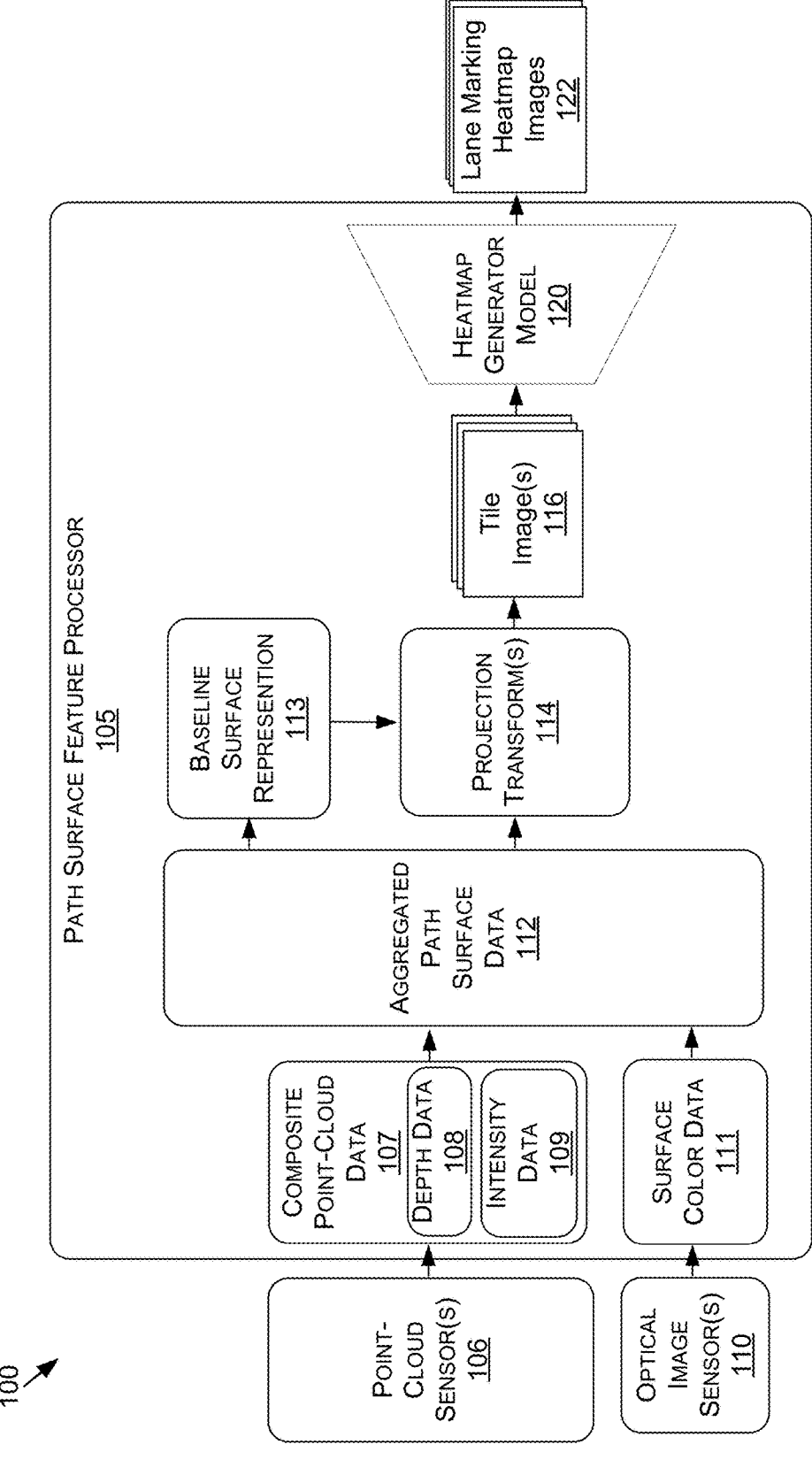
FIG. 1 is a data flow diagram for a path surface lane marking heatmap generator system, in accordance with some embodiments of the present disclosure.

Systems and methods are disclosed related to point cloud-based heatmap generation for path surface road marking detection and classification. Although the present disclosure may be described with respect to map development, perception, or other aspects of autonomous or semi-autonomous systems and applications, this is not intended to be limiting. For example, the systems and methods described herein may be used by and/or in conjunction with, without limitation, non-autonomous vehicles or machines, semi-autonomous vehicles or machines (e.g., in one or more advanced driver assistance systems (ADAS)), autonomous vehicles or machines (such as autonomous or semi-autonomous vehicle or machine 700—alternatively referred to herein as "vehicle 700" or "ego-machine 700," an example of which is described with respect to FIGS. 7A-7D), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to path surface road marking detection and classification for autonomous driving, this is not intended to be limiting, and the systems and methods described herein may be used in augmented reality, virtual reality, mixed reality, robotics, security and surveillance, autonomous or semi-autonomous machine applications, and/or any other technology spaces where maps of path surfaces may be used.

The present disclosure relates to generating maps (e.g., high-definition (HD) maps, navigational maps, etc.) for roads, highways, and/or other pathways. More specifically, the systems and methods presented in this disclosure provide for technologies that detect and classify road markings from road surfaces for use in generating maps and other applications-such as for live perception, vehicle navigation and control, path planning, and/or the like.

Traditional technologies for road marking detection may use image segmentation techniques to perform pixel-wise classifications on a camera-captured image to detect road surface landmark types, such as solid lane lines and broken (e.g., dashed) lane lines, for example. Example road marking include, but are not limited to, lane markings and navigation boundaries. In this disclosure, example embodiments and descriptions referring to lane markings may be expanded and understood to encompass road markings generally. Because of optical phenomena such as perspective distortion, image data from cameras becomes less accurate for features at increasing distances farther from the camera. For example, as features become more distant, the captured features may appear smaller in an image and may be represented by a fewer number of pixels as a result. Accordingly, image segmentation becomes increasingly less reliable for classifying lane markings at greater distances from the image sensor. For example, with increasing distance, a camera-based lane marking detection system becomes less able to accurately identify features such as the precise center of a lane marking in order to determine a relative position of that lane marking with respect to other lane markings or other features. Camera-based lane marking detection can also be sensitive to poor ambient lighting conditions that can produce shadows, glare, and/or other optical artifacts in the image data that obscure or distort the appearance of a lane marking.

Other existing technologies for lane marking detection may use LIDAR-based techniques. LIDAR-based lane marking detection, in contrast to optical camera-based techniques, is not substantially affected by ambient lighting conditions, and can provide accurate measurements of the distance between a LIDAR sensor and a lane marking. However, LIDAR point-cloud data becomes increasingly sparse with distance and therefore also becomes less reliable for classifying lane markings with increasing distance from the LIDAR sensor. LIDAR-camera fusion techniques represent another lane marking detection technology. LIDAR-camera fusion captures perspective optical images to detect lane markings and back-projects those detected lane markings onto LIDAR sensor-captured data through a transformation matrix, giving greater context to the detected lane markings. However, due to perspective distortion, the detections of lane markings are less accurate for features that are farther away from the LIDAR and camera sensors. Moreover, the back-projection process relies on an accurate calibration and alignment between the camera and LIDAR sensors to correlate detected lane markings with corresponding points of the LIDAR data, adding another potential source of error.

In contrast to these traditional systems for lane marking detection, one or more of the embodiments described herein use a combination of camera and LIDAR data to generate a set of top-down tile images (or other top-down or bird's eye view (BEV) representation type) produced from multimodal sensor data and apply that set of top-down tile images to a deep neural network (DNN) generator architecture model to produce lane marking specific heatmap images corresponding to the set of top-down tile images. The multimodal sensor data may include LIDAR-captured intensity channel data, LIDAR-captured feature height channel data, and optical color image channel data. The set of top-down tile images may be processed by the generator model to automatically detect road markings such as lane boundaries and/or navigation boundaries to generate pixel-level heatmap images that may classify lane or road boundary markings by marking characteristics such as line type, line color, and/or other characteristics.

To produce a set of top-down tile images from multimodal sensor data, raw path surface data may be gathered using LIDAR and optical image camera sensors that are mounted to a moving platform (e.g., an automobile or other vehicle) that travels down a pathway (e.g., road or highway). The moving platform may travel down the pathway as the sensors continuously capture LIDAR point-cloud data and/or optical image frames of the path surface. The result is an aggregated point-cloud for a segment of the pathway of a defined length (e.g., on the order of kilometers) with corresponding overlapping optical image frames. As an example, the LIDAR sensor may operate with a frequency of ten Hertz to produce ten scans of LIDAR point cloud data per second as the platform progresses down the pathway. Frames of optical image data and LIDAR point-cloud data may be timestamped so that the image data may be correlated with corresponding LIDAR data for the segment of the pathway. Because the LIDAR-captured data aggregates into a composite point-cloud as the platform moves (e.g., using ego-motion compensation), points of the point-cloud corresponding to features of the pathway surface accumulate and build in density both over time and as the surface features become closer to the LIDAR sensor. The resulting composite point-cloud thus provides a dense dataset of LIDAR data covering the entire pathway segment. A projection transform may then be used to project the points of the composite point cloud onto a plane corresponding to a plane of the pathway surface. For example, the composite point cloud may include road surface depth data that may be used to establish a baseline surface representation (e.g., a plane) of the pathway surface. The projection transform may be used to generate an orthogonal projection of the points of the composite point cloud onto that baseline surface representation. A rotation-translation transform may be applied to rotate the composite point cloud with respect to the baseline surface representation to produce a top-down view of the baseline surface representation of the segment of the pathway as seen looking down through the composite point cloud. The data provided by individual points may indicate an intensity and/or a depth of a feature on the surface of the pathway that the individual points orthogonally project onto. In some embodiments, a rotation-translation transform may similarly be used to map pixels of the captured optical image frames to a coordinate system of the baseline surface representation so that a combination of intensity, depth, and color data is obtained for features on the surface of the pathway, as would be observed from a BEV of the pathway. The segment of the pathway covered by the composite point cloud may be subdivided into portions of the pathway to define a sequence of top-down view tile images, where the data provided by each tile image corresponds to a specific surface area of the pathway. Each top-down tile image may be applied to the generator model to generate one or more heatmap images indicative of lane markings detected within the tile image and one or more classifications based on characteristics of the lane markings, as inferred by the generator model. In some embodiments, the heatmap images may be generated to have dimensions and a resolution that matches those of the tile image so that individual pixels of a heatmap image provide data corresponding to individual pixels of the tile image, and accordingly, the heatmap image pixels provide data corresponding to a specific location on the pathway surface. In some embodiments, navigation data, such as satellite navigation data (e.g., Global Positioning System (GPS) data) and/or Real Time Kinematics (RTK) data may be captured as the LIDAR and/or camera image frames are captured and used to correlate and map the position of a tile image and/or the heatmap images for that tile image to geographic locations. In this way, in some embodiments, the heatmap images may be mapped to segments of the real-world pathway to represent characteristics of lane marking appearing on the surface of those pathway segments.

As mentioned herein, in some embodiments, for each tile image the input to the generator model may include LIDAR-determined intensity data, LIDAR-determined height data, and/or camera image-determined color data (e.g., RGB color data). The intensity data may indicate the reflectance of the road surface at each pixel of the tile image. For example, lane markings often include embedded reflective particles or are otherwise more reflective than other unmarked sections of a road surface to make them easier to sec. With the rotation of the composite point cloud to a top-down view and orthogonal projection of its points onto the baseline surface representation of the pathway surface, the depth data collected by the LIDAR sensor may be interpreted as height data, indicating the offset in height of a feature with respect to the baseline surface representation. Because lane markings often comprise paints, thermoplastics, resins, or other materials applied onto the top of a road surface, the surface of the lane markings rises up above the height of the other unmarked sections of the road surface, which is detectable from the LIDAR-collected depth data. As such, the height data may be useful for detecting and classifying navigation boundaries. For example, height data may be used to readily differentiate foreground (road marking/lane marking) pixels versus background (unmarked road surface) pixels. Navigation boundaries may include features such as, but not limited to, curbs and barriers. In some embodiments, pixels representing a navigation boundary not belonging to a known boundary type may be classified as an "unknown type" road marking.

The data obtained from the optical image frames may be used to capture the color of lane markings. In some embodiments, the camera and LIDAR sensor may be integrated together as a single device that generates a combined output that comprises the intensity, depth, and/or color data. In some embodiments, the camera and LIDAR sensor may separately implemented. One or more sensor calibration parameters (e.g., a rotation-translation transform) used to correlate the orthogonal projection of point-cloud points with pixels of a camera image frame to associate color data with individual pixels of a tile image (e.g., in addition to the intensity and height data). In some embodiments, color data (e.g., RGB color data) can be associated with points of the LIDAR point-cloud based on matching timestamps instead of, or in addition to, using sensor (intrinsic and/or extrinsic) calibration parameters. Because the resulting set of intensity, height, and/or color data is obtained from an aggregation of overlapping data collected on a moving platform and projected orthogonally onto a baseline surface representation of the pathway surface, errors that may otherwise be caused by perspective distortion, lighting conditions, and/or occlusions are substantially avoided and/or at least diminished.

In some embodiments, tile images may be preprocessed into a standardized frame with respect to pixel dimensions and data channels prior to being applied to the generator model. For example, in some embodiments, the height data from the LIDAR sensor may include color components (e.g., determined as a function of range and reflection data) that may be processed into a single channel of height data. For example, for 8-bit RGB color, a channel of height data for a point of the LIDAR point-cloud may be computed based on the expression:

$$Height_{point} = 256 \times Height_{Red} + Height_{Green} + \frac{Height_{Blue}}{256} - 32768$$

where from the LIDAR data, $Height_{Red}$ is the detected red channel height component, $Height_{Green}$ is the detected green channel height component, and $Height_{Blue}$ is the detected red channel height component. In some embodiments, the height data across a tile image may be normalized, for example based on the expression:

$$Height_{point-normalized} = \frac{Height_{point} - Height_{point-min}}{Height_{point-max} - Height_{point-min}}$$

where for that tile image, $Height_{point-min}$ is the minimum measured height, and $Height_{point-max}$ is the maximum measured height. Intensity data and color data may similarly be normalized across a tile image. For example, in some embodiments, each of three channels of 8-bit RGB intensity data from LIDAR may be normalized by dividing the data value of each channel by 256 (e.g., so that each intensity channel is scaled to a value of 0 to 1), and each of three channels of 8-bit RGB color data from camera images may be normalized by dividing the data value of each channel by 256 (e.g., so that each color channel is scaled to a value of 0 to 1). In one or more such embodiments, three intensity, one height, and three color channels may thus be concatenated into an array of seven channels that corresponds with an associated pixel of the tile image.

In one or more embodiments, with intensity, height, and color data channels defined for each pixel of the tile image, the tile image with these channels may be applied to a generator model to produce one or more heatmap images. In some embodiments, the generator model may output a heatmap image for each road marking characteristic classification the generator model is trained to predict. As non-limiting examples, the generator model may output a first heatmap image where the intensity of a pixel indicates confidence in a line characteristic prediction that the pixel is associated with a detected single solid line lane marking, a second heatmap image where the intensity of a pixel indicates confidence in a line characteristic prediction that the pixel is associated with a detected single broken line lane marking, a third heatmap image where the intensity of a pixel indicates confidence in a line characteristic prediction that the pixel is associated with a detected yellow line lane marking, and a fourth heatmap image where the intensity of a pixel indicates confidence in a line characteristic prediction that the pixel is associated with a detected yellow line lane marking. In some embodiments, pixels having predicted confidence values that at least meet a threshold are defined as lane marking pixels. In some embodiments, for each pixel predicted as defining a lane marking pixel, the generator model may further generate an angle value indicating a predicted angle of the lane marking (e.g., with respect to the pixel coordinate frame of the tile image). The heatmap images produced by the generator model may have dimensions matching those of the input tile images so that there is a one-to-one correspondence between the values for a pixel at a given column and row coordinate of a heatmap image and a pixel having the corresponding column and row coordinate of the tile image. In some embodiments, heatmap images generated for different road marking characteristic classifications may be combined into a composite heatmap image providing a comprehensive indication of the different line types of lane markings detected on the pathway surface covered by the input tile image.

In some embodiments, the generator model comprises a deep neural network (DNN)-based semantic segmentation model trained using a generative adversarial network (GAN) training approach. As discussed in greater detail below, the generator model and a discriminator model may engage in a two-play zero-sum task where the generator model iteratively learns to generate more accurate heatmap images, and the discriminator model iteratively learns to better discern generator model-produced heatmap images from ground truth labeled heatmap images. Training may continue, for example, until the generator model achieves an optimal heatmap generation quality threshold and/or until the discriminator model can no longer distinguish between a generator model-produced heatmap image and a ground truth labeled heatmap image. A set of one or more loss functions may be computed at each training iteration (e.g., a cross-entropy loss, a perceptual loss, an L1 loss, and/or a generative adversarial (GAN) loss) that are computed by a loss optimizer function. Over the course of training iterations, the generator model may adjust based on the loss function(s) to attempt to minimize the loss function(s) while the discriminator model adjusts to try to maximize the loss function(s).

With respect to the generator model, the machine learning model may comprise an encoder-decoder architecture, with multiscale feature extraction and context extraction functional layers intervening between the encoder model and the decoder model. The encoder model and decoder model may be implemented using one or more machine learning models such as a recurrent neural network (RNN) or other form of neural network. The encoder model may operate to compress one or more of the data channels of an input tile image into an encoded fixed-length representation in the form of an encoder vector (e.g., which may represent a set of stochastic latent embeddings for the tile image). In some embodiments, the encoder model comprises a down-sampling machine learning encoder, and the decoder model comprises an up-sampling machine learning decoder for semantic segmentation.

For example, the encoder model may receive the input tile image with the intensity, height, and/or color data channels, and down-sample the tile image into layers of different resolutions to extract image features at different resolutions. The multiscale feature extraction functional layer of the generator model receives from the encoder model the encoder vector representing the multiscale image layers, and performs multiscale feature extractions and feature fusion to estimate segmentations of road marking landmarks from the plurality of resolution layers. For example, the multiscale feature extraction function may be implemented based on the High-Resolution Network (e.g., HRNetV2 network), which may comprise a general purpose convolutional neural network and is often used for human pose estimation applications.

In some embodiments, the context extraction functional layer of the generator model operates to encode long-range context information as contextual features. For example, the context extraction functional layer may extract a contextual feature that indicates an association of non-adjacent pixels across the tile image, such as an association between pixels that belong to separate dashes of a dashed line lane marking, pixels of different lines of a double line lane marker, or pixels of a lane marking at opposing ends of a tile image that are too far separated to be associated by standard convolutional techniques. In some embodiments, the context extraction functional layer may use attention mechanisms (e.g., self-attention based techniques) that determine contextual interactions between non-adjacent pixels based on attention maps. In some embodiments, the context detection mechanism is implemented using Lambda layers of a LambdaNetwork that capture long-range interactions in data. Further details regarding Lambda layers may be found in Bello, Irwan, "LAMBDANETWORKS: MODELING LONG-RANGE INTERACTIONS WITHOUT ATTENTION," International Conference in Learning Representations 2021, the contents of which are incorporated herein by reference in their entirety. In some embodiments, the context extraction functional layer may apply attention mechanisms and/or lambda layers to dynamically distribute contextual features to produce a contextual features output to the decoder model.

The decoder model, based on the lane marking landmark segmentation estimates from the multiscale feature extraction and the contextual features of pixels extracted by the context extraction functional layer, may generate an initial prediction comprising a plurality of heatmap images with individual heatmap images corresponding to the different road marking characteristics. For individual pixels, the prediction may include, for example, a binary classifier for the overall foreground (e.g., lane marking foreground pixels versus unmarked surface background pixels), a multiclass classifier on foreground pixels for lane type classifications (e.g., solid line, broken line, single line, and/or double line lane markings), a multiclass classifier on foreground for lane colors classification, and/or a classifier for a lane marking direction (e.g., angle) indication. In some embodiments, the marker direction angle may be predicted by an additional regression layer within the decoder model. In some embodiments, the initial prediction of heatmap images may be up-sampled by the decoder model to match the dimensional size of the input tile image using bilinear up-sampling operations combined with convolutional layers.

With respect to the training of the generator model, in some embodiments the discriminator model may comprise a convolutional classifier, such as a PatchGAN classifier. A PatchGAN classifier is a type of discriminator that considers an input as a collection of local image patches and penalizes structure at the scale of those local image patches. For example, the discriminator model when implemented using a PatchGAN classifier may attempt to classify each N×N pixel local image patch in a heatmap image as being a real image (e.g., a ground truth heatmap image), or as a predicted heatmap image produced by the generator model.

In some embodiments, data augmentation may be used to augment the training data including random scaling, random rotation, random color jittering, and/or random cropping. The dimensions of the training data input to the generator model during training may be different than the dimensions of the tile images input to the generator model for predicting heatmap images. For example, cropped training data arrays of 768×768 pixels may be used for training to produce a generator model that can make predictions from 1024×1024, 2048×2048 and/or rectangular (e.g., 2816×2304) tile images. In some embodiments, the discriminator model may comprise one or more down-sampling blocks (e.g., a four down-sampling block discriminator model) where an individual down-sampling block may include a convolution layer followed by a spectral normalization layer, an instance normalization layer, a leaky rectified linear unit (ReLU)

layer, and/or an average pooling layer. In some embodiments, the first down-sampling block may not include the spectral normalization layer. In some embodiments, the final down-sampling block may not include an average pooling layer. The output of the one or more down-sampling blocks may be processed through a convolution layer (e.g., a 1×1 convolution layer) to produce an output of predetermined dimensions.

For example, in some embodiments, a first input to the discriminator model may comprise a 768×768×1-sized heatmap image produced by the generator model, where the third dimension of size "1" is a data channel that may convey a confidence of a pixel being a lane marking of the line characteristic for that heatmap image (e.g., an indication of whether the pixel is predicted to be a foreground pixel). A second input to the discriminator model may comprise a 768×768×1-sized ground truth heatmap image corresponding to the line characteristic of the input heatmap image of the first input. These inputs may be processed by the one or more down-sampling blocks of the discriminator model and applied to the convolution layer to produce an output data array of 96×96×1 dimensions. The discriminator model may evaluate the output data array to predict which of the two inputs was generated by the generator model. A loss optimizer function may compute one or more loss functions to produce one or more losses based on whether the prediction of the discriminator model is correct. Using the one or more losses as feedback, the generator model iteratively learns to generate more accurate heatmap images, and the discriminator model iteratively learns to better discern generator-model produced heatmap images from ground-truth labeled heatmap images. In some embodiments the one or more loss functions may compute one or more of a cross-entropy loss, a perceptual loss, an L1 loss, and/or a generative adversarial (GAN) loss. For example, the loss functions loss may quantify a representation of distance and/or difference between feature embeddings of a generator-produced heatmap and feature embeddings of a ground truth heatmap image. In some embodiments, the L1 loss may be used to adjust lane marking angle predictions. In one or more embodiments, the perceptual loss may be applied to penalize an L1 loss norm between predicted and ground truth feature extractions. With respect to the cross-entropy loss, a small weight (e.g., 0.01) may be assigned to background pixels (e.g., pixels of unmarked road surface) to compensate for data imbalances. The GAN loss may include losses for training one of both of the generator model and the discriminator model, and in some embodiments may be implemented as a least-square GAN loss. In some embodiments, one or more of these losses may be independently computed and fed back as a composite loss to train the generator model and/or the discriminator model.

In one or more embodiments, training data may be preprocessed to deal with the issue of missing ground truth labels that may adversely affect recall. For example, occasionally training data may comprise a valid image where one or more lane markings are missing labels. When such training images are input to the generator model in training, a generator model may learn incorrect inferences due to the ambiguity of having two substantially similar lane marking features that are not similarly labeled. Accordingly, in some embodiments, a training mask may be produced for each training image that includes within the mask the labeled lane marking features that the generator model is to train on, and that excludes from the mask unlabeled lane marking features that the generator model is to ignore during training. For example, a training mask may be created for cross-entropy loss using ground truth labels and LIDAR-derived height images. A training data preprocessor may apply a binary dilation method to dilate a labeled ground truth heatmap and create a first mask. Based on defining pixels with a zero height as not belonging to the pathway, the preprocessor uses this information to create a second mask of pixels that do belong to the pathway. The first and second masks are added together to generate the final training mask. During training for the cross-entropy loss, back-propagation is limited to pixels that are located within this training mask.

In some embodiments, the heatmap images generated by the generator model may be used to produce high-definition (HD) maps of roads and highways that may be used for navigation and localization applications by autonomous or semi-autonomous vehicles and machines. For example, a set of heatmap images generated from a tile image may be used to define a traffic control map that indicates the location and characteristics of lane markings for a segment of a pathway corresponding to the tile image. A set of traffic control maps derived in this manner may be sequentially linked to produce a comprehensive HD map of the pathway, which may be used, for example, to plan vehicle routes and/or control real-time or near real-time navigation (e.g., localization) of vehicles traveling on the pathway represented by the HD map. In some embodiments, vector-based lane lines may be generated for an HD map based on the lane marking predictions provided by the heatmap images. For example, vector-based lane lines may be generated that link lane marking predictions for one tile image with lane marking predictions of the same line type for a neighboring tile image. In some embodiments, vectorization based on the heatmap images may be used to produce a graphical skeleton of lane markings, where the lines of the graphical skeleton may be projected onto pixel locations of the tile image to align lane marking for the tile images and/or generate the HD map. In various embodiments, the HD map may be used to generate simulation environments, such as those used for gaming, vehicle traffic simulations, and/or autonomous or semi-autonomous vehicle training. In one or more embodiments, the heatmap images generated from a tile image may be used as ground truth training data for training other machine learning models.

As described in greater detail herein, one or more aspects of the generator model and/or discriminator model may be executed at least in part on one or more graphics processing units that may operate in conjunction with software executed on a central processing unit coupled to a memory. The graphics processing units are programmed to execute kernels to implement one or more of the features and functions of the generator model and/or discriminator model. In some embodiments, aspects of the generator model and/or discriminator model may be executed in parallel on different GPUs and/or other parallel processing units (PPUs). In some embodiments, some features and functions of the generator model and/or discriminator model may be distributed and performed by a combination of processors and cloud computing resources. For example, in some embodiments, the generator model and/or the discriminator model may be implemented at least in part as a virtual function on a cloud computing environment and/or implemented as a component of a virtualized machine learning model.

With reference to FIG. 1, FIG. 1 is a data flow diagram for an example path surface lane marking detection system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

As shown in FIG. 1, path surface lane marking detection system 100 may comprise a path surface feature processor 105 that receives composite surface point cloud data 107 captured from a surface of a pathway by one or more point cloud sensors 106 and/or surface color data 111 captured from the surface of the pathway by one or more optical image sensors 110. Point cloud sensor(s) 106 may comprise a RADAR sensor, a LIDAR sensor, and/or another sensor that generates depth data in the form of a point cloud and/or in another form. As such, even though referred to as point cloud sensor(s) 106, this is not intended to be limiting, and the point cloud sensor(s) 106 may generate output representations that are different from point clouds in some embodiments. The surface color data 111 may be derived from optical image data captured by one or more optical image sensors 110 that may be positioned on a moving platform (e.g., vehicle 700). An optical image sensor 110 may comprise, for example, a camera or other optical sensor that captures, as non-limiting examples, RGB, IR, and/or RGB-IR image frames. In some embodiments, a point cloud sensor 106 and/or optical image sensor 110 may comprise a sensor and/or camera, such as described with respect to FIGS. 7A and/or 7B. In some embodiments, composite surface point cloud data 107 may comprise point cloud data that includes a fusion of images from multiple point cloud sensors 106. In some embodiments, surface color data 111 may comprise image data that includes a fusion of images from multiple optical image sensors 110. Based on the composite surface point cloud data 107 and surface color data 111, path surface feature processor 105 uses a heatmap generator model 120 to generate one or more lane marking heatmap images 122.

In one or more embodiments, the path surface feature processor 105 produces a set of top-down view tile images 116 from the composite surface point cloud data 107 and surface color data 111. As discussed above, a moving platform may travel down a pathway as the point cloud sensor(s) 106 and optical image sensor(s) 110 capture point-cloud data and/or optical image frames of the path surface. Points of the composite point cloud data 107 may comprise depth data 108 and/or surface intensity data 109. The depth data 108 may include depth information for regions of the pathway surface where lane markings have been applied, as well as the unmarked regions of the pathway surface. Because lane markings often comprise paints, thermoplastics, resins, or other materials applied onto the top of a road surface, the surface of the lane markings may rise up in height above the unmarked sections of the pathway surface. The height data for the lane markings may be detected based on relative differences between the depth data for the marked and unmarked sections of the pathway surface. The height data may be used by the heatmap generator model 120 for detecting and classifying navigation boundaries and may be used to readily differentiate foreground (lane marking) pixels versus background (unmarked road surface) pixels. The surface intensity data 109 may indicate the reflectance of the different regions of the pathway. For example, lane markings often include embedded reflective particles or are otherwise more reflective than other unmarked sections of a road surface to make them easier to see.

In some embodiments, image frames of the surface color data 111 and the composite point-cloud data 107 may be timestamped, or otherwise marked, so that the color data may be correlated with corresponding point-cloud data for the segment of the pathway. The LIDAR-captured data aggregates into a composite point-cloud as the point cloud sensor(s) 106 move so that points of the composite point cloud data 107 corresponding to features of the pathway surface accumulate and build in density both over time and as the surface features become closer to the point cloud sensor(s) 106. The resulting composite point cloud data 107 thus provides a dense dataset of depth and intensity data that may be combined with the surface color data 111 to produce the aggregated path surface data 112 covering the pathway segment.

One or more projection transforms 114 may then be applied by the path surface feature processor 105 to project the produce the aggregated path surface data 112 onto a plane corresponding to the pathway surface. For example, in some embodiments the composite point cloud data 107 may include road surface depth data that may be used by the path surface feature processor 105 to define a baseline surface representation 113 (e.g., a plane) of the pathway surface. The projection transform 114 may generate an orthogonal projection of the points and/or color data of the aggregated path surface data 112 onto that baseline surface representation 113. In some embodiments, the projection transform 114 may apply a rotation-translation transform to rotate the composite point cloud data 107 and/or surface color data 111 with respect to the baseline surface representation to produce a top-down view of the baseline surface representation 113 of the segment of the pathway as seen looking down through the composite point cloud data 107. The aggregated path surface data 112 may be subdivided into portions of the pathway to define the sequence of top-down view tile images 116, where the data channel provided by each tile image corresponds to a specific surface area of the pathway.

Figure 2:
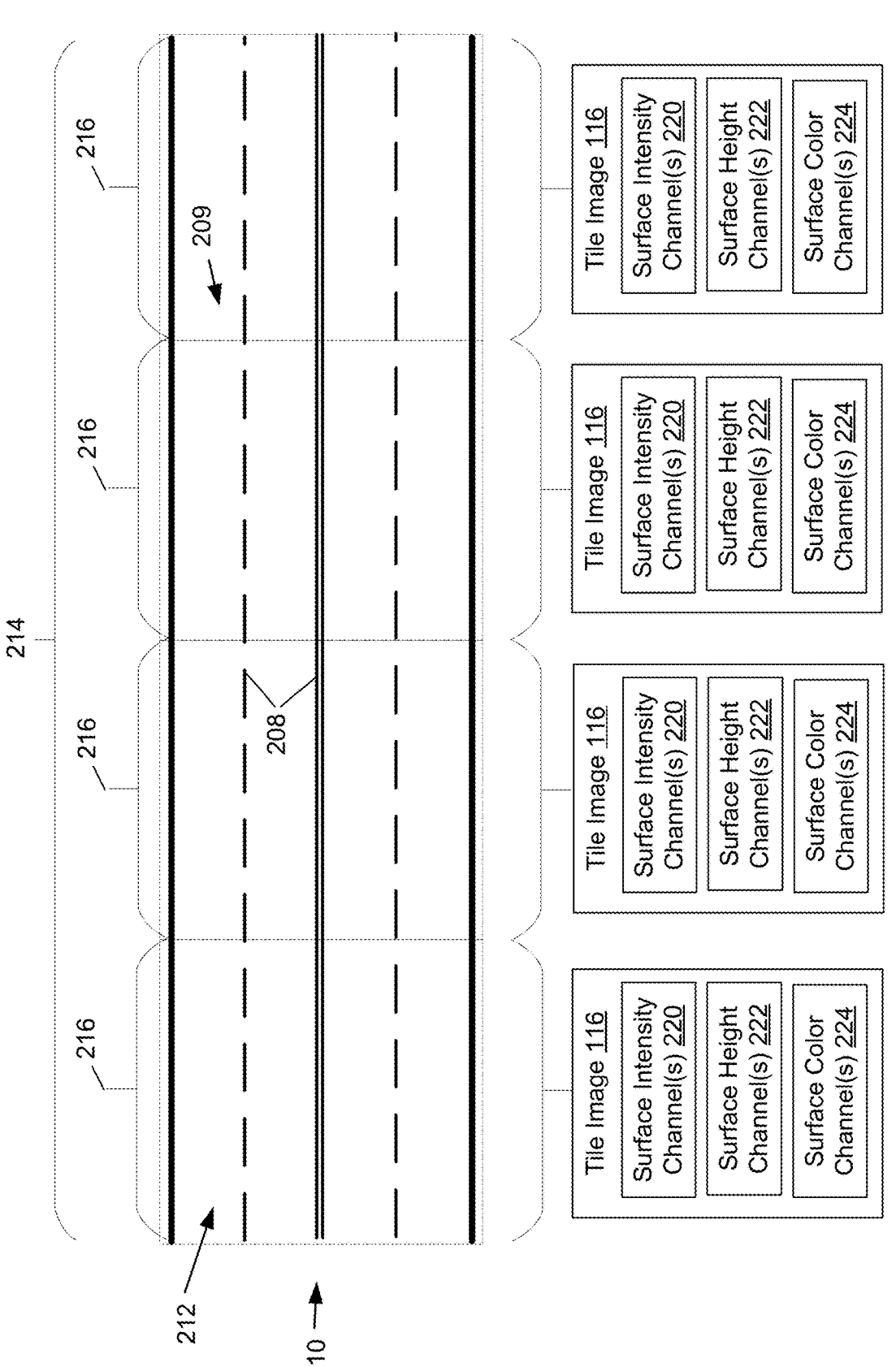
FIG. 2 is a block diagram that illustrates multimodal tile images, in accordance with some embodiments of the present disclosure.

For example, referring now to FIG. 2, FIG. 2 illustrates a segment 214 of a pathway 210. For example, the pathway 210 may comprise a segment of a road or highway that is, for example, one or more kilometers in length. The pathway 210 comprises a surface 212 that includes lane markings 208 and unmarked surface areas 209. In some embodiments, the aggregated path surface data 112 may be collected by the point cloud sensor(s) 106 and/or optical image sensor(s) 110 as they move down the segment 214 of pathway 210. The point cloud sensor(s) 106 and/or optical image sensor(s) 110 may scan the surface 212 at a frequency such that multiple overlapping scans are obtained over the segment as the platform with the sensors moves. Points of the aggregated path surface data 112 corresponding to features of the pathway surface 212 accumulate and build in density both over time and as the surface features become closer to the sensors. The collected data may then be rotated and/or orthogonally projected onto the baseline surface representation 113, which represents a baseline plane of the surface 212 of pathway 210. In some embodiments, the tile images 116 may be generated by the path surface feature processor 105 by subdividing the segment 214 into subdivisions 216, each corresponding to a length of the pathway 210. That is, a tile image 116 may comprise data channels that include the point-cloud and color data that is projected by the projection transform 114 onto the baseline surface representation 113 within the bounds of a subdivision 216 of the segment 214. As shown in FIG. 2, each tile image 116 may comprise one or more of surface intensity channel(s) 220, surface height channel(s) 222, and surface color channel(s) 224). The data provided by individual pixel channels of a tile image 116 may thus indicate an intensity, height, and/or a color of a feature on the surface of the pathway that the individual points of the aggregate path surface data 112 orthogonally project onto. Each tile image 116 may thus comprise a combination of intensity, depth, and/or color data features on the surface of the pathway 210, as would be observed from a bird's-eye top-down view of the pathway 210.

Figure 3:
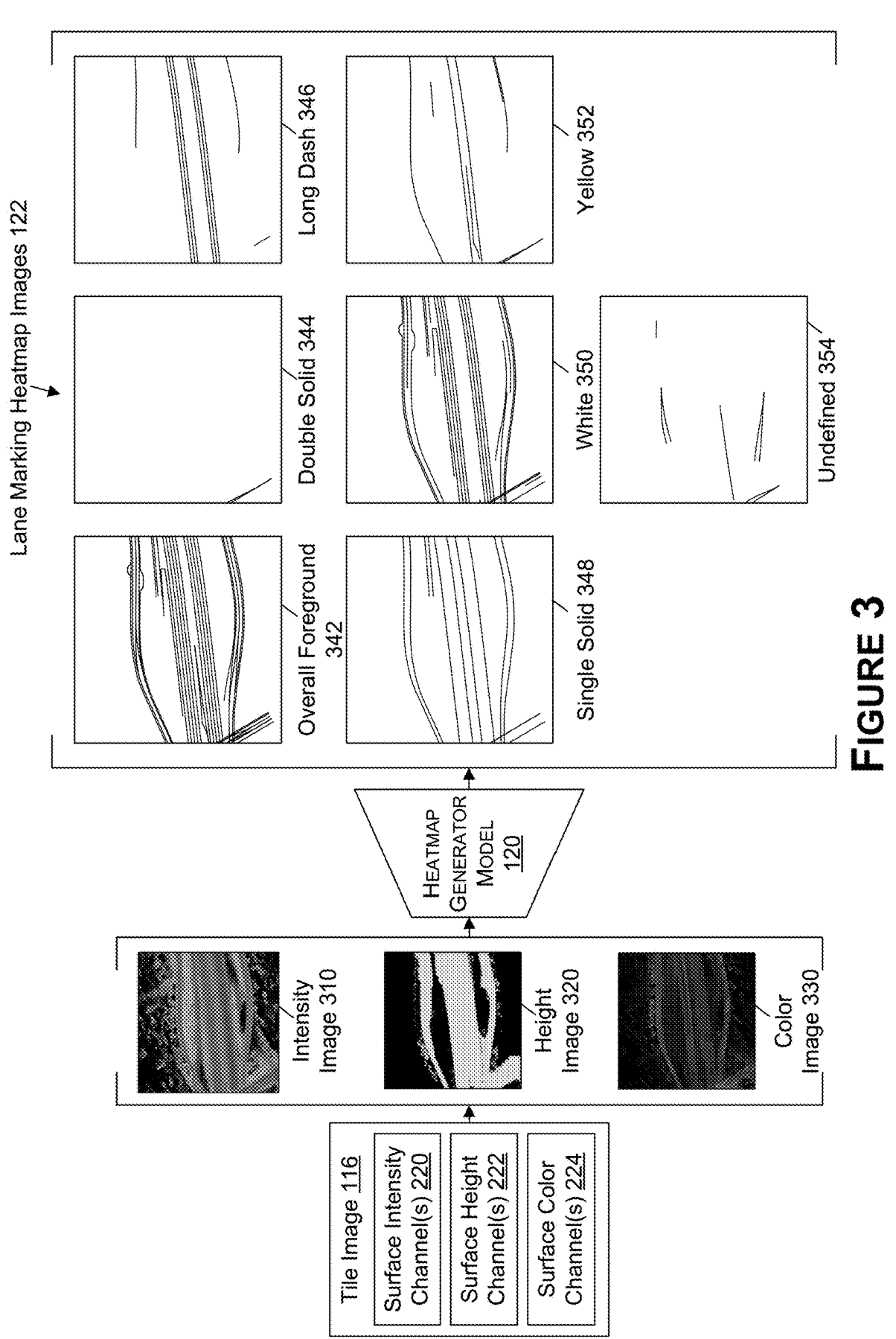
FIG. 3 is a diagram illustrating generation of a plurality of lane marking heatmap images from a tile image, in accordance with some embodiments of the present disclosure.

Each top-down tile image 116 may be applied to the heatmap generator model 120 to generate one or more lane marking heatmap images 122 indicative of lane markings detected within that tile image 116. The lane marking heatmap images 122 may indicate one or more classifications based on characteristics of the lane markings as inferred by the heatmap generator model 120. For example, as shown in FIG. 3, a tile image 116 comprising surface intensity channel(s) 220 (which may be represented as an intensity image 310), surface height channel(s) 222 (which may be represented by a height image 320), and surface color channel(s) 224 (which may be represented by a color image 330) may be provided as input to the heatmap generator model 120. Based on the tile image 116, the heatmap generator model 120 may infer characteristics of lane marking features from the tile image 116 and generate a prediction comprising one or more lane marking heatmap images 122. In some embodiments, the lane marking heatmap images 122 may be generated to have dimensions and a resolution that matches those of the tile image 116 so that individual pixels of a lane marking heatmap image 122 provide data corresponding to individual pixels of the tile image 116, and accordingly, a pixel of each heatmap image provides data corresponding to a specific location on the surface 212 of the pathway 210.

In some embodiments, the generator model may output a prediction that comprises a set of heatmap images, with each heatmap image corresponding to a road marking characteristic classification that the heatmap generator model 120 is trained to predict. As an example, the prediction may include a binary classifier for an overall foreground heatmap 342 (e.g., lane marking foreground pixels versus unmarked surface background pixels). The prediction may include multiclass classifiers for the foreground pixels (e.g., as identified by the overall foreground heatmap 342) for lane type classifications, such as but not limited to a double solid line lane marking heatmap 344, a long dash (broken line) lane marking heatmap 346, a single solid line lane marking heatmap 348. The prediction may include multiclass classifiers for the foreground pixels for a lane marker color classification, such as but not limited to a white lane marking heatmap 350 and a yellow lane marking heatmap 352. In some cases, the heatmap generator model 120 may recognize a feature extracted from a tile image 116 as having characteristics of a lane marking, but not aligning with a learned lane characteristic classification. In such cases, the prediction from the heatmap generator model 120 may include an undefined lane marking heatmap 354 indicating pixels where undefined lane markings are located.

In some embodiments, the heatmap generator model 120 may compute confidence values indicating a confidence in the predicted classification of a pixel. Those pixels having confidence values that at least meet a threshold are defined as lane marking pixels within the particular classification associated with a heatmap image. In some embodiments, for one or more of the pixels of a lane marking heatmap image 122 predicted as defining a lane marking pixel, the generator model may further generate an angle value indicating a predicted angle of the lane marking (e.g., with respect to the pixel coordinate frame of the tile image).

The lane marking heatmap images 122 produced by the heatmap generator model 120 may have dimensions matching those of the input tile image 116 so that there is a one-to-one correspondence between the values for a pixel at a given column and row coordinate of a heatmap image 122 and a pixel having the corresponding column and row coordinate of the tile image 116. In some embodiments, lane marking heatmap images 122 generated for different road marking characteristic classifications may be combined into a composite heatmap image providing a more comprehensive indication of the different line characteristics (e.g., type and/or color) of lane markings detected on the pathway surface covered by the input tile image. As an example, the location of yellow dashed line lane markings within a tile image 116 may be determined based on identifying pixels for lane marking that appear in both the long dash (broken line) lane marking heatmap 346 and the yellow lane marking heatmap 352.

In some embodiments, navigation data, such as satellite navigation data (e.g., Global Positioning System (GPS) data) and/or Real Time Kinematics (RTK) data may be captured as the point-cloud and/or camera image frames are captured, and used to correlate and map the position of a tile image 116 and/or the heatmap images 122 for that tile image 116 to the geographic location of the corresponding subdivision 216 of pathway segment 214. In this way, in some embodiments, the lane marking heatmap images 122 may be mapped to segments of the real-world pathway 210 to represent characteristics of lane marking appearing on the surface 212 of that pathway segment 214.

Figure 4:
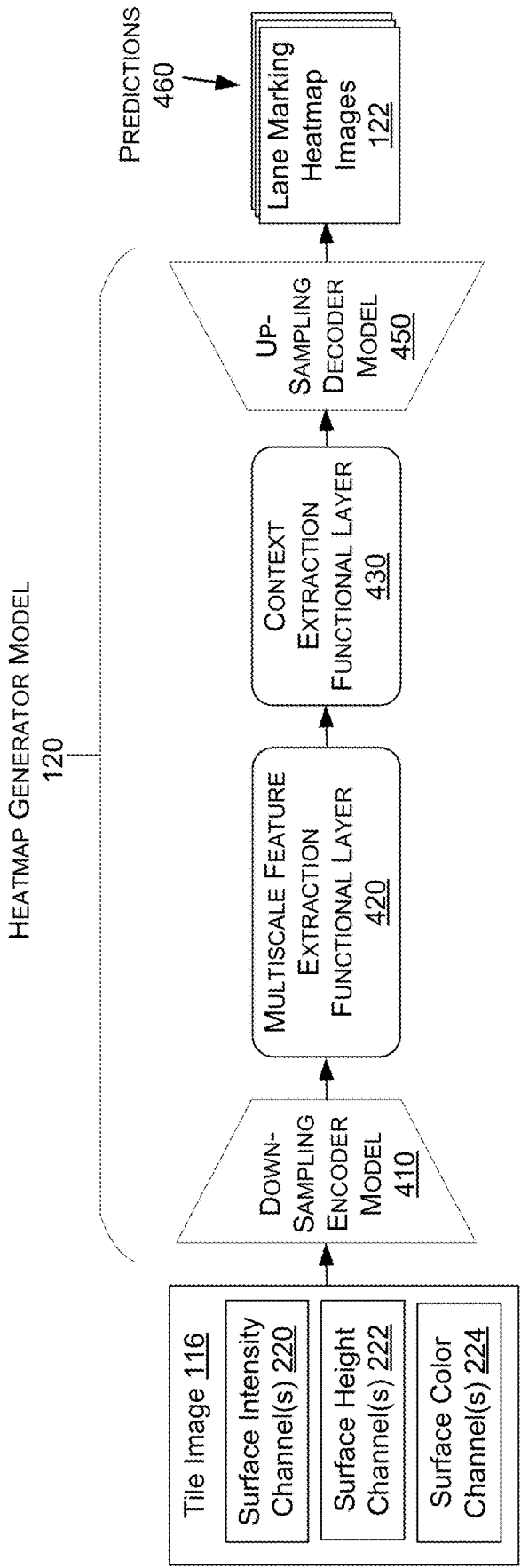
FIG. 4 is a diagram illustrating an encoder-decoder architecture for a heatmap generator model, in accordance with some embodiments of the present disclosure.

With respect to the architecture of the heatmap generator model 120, the heatmap generator model 120 may comprise an encoder-decoder architecture machine learning model. As shown in FIG. 4, the heatmap generator model 120 may comprise a down-sampling encoder model 410 and an up-sampling decoder model 450, with a multiscale feature extraction functional layer 420 and a context extraction functional layer 430 intervening between the encoder model 410 and the decoder model 450. The encoder model 410 and decoder model 450 may be implemented using one or more machine learning models such as a recurrent neural network (RNN) or other form of neural network. The encoder model 410 may operate to compress one or more of the data channels of an input tile image 116 (e.g., the surface intensity channel(s) 220, surface height channel(s) 222, and/or surface color channel(s) 224) into an encoded fixed-length representation in the form of an encoder vector (e.g., which may represent a set of stochastic latent embeddings for the tile image 116). In some embodiments, the encoder model 410 comprises a down-sampling machine learning encoder, and the decoder model 450 comprises an up-sampling machine learning decoder for semantic segmentation.

In some embodiments, the encoder model 410 may receive an input tile image 116 and down-sample the tile image into layers of different resolutions to extract image features at different resolutions. The multiscale feature extraction functional layer 420 receives from the encoder model 410 the encoder vector representing the multiscale image layers and performs multiscale feature extractions and feature fusion to estimate segmentations of road marking landmarks from the plurality of resolution layers. For example, the multiscale feature extraction functional layer 420 may be implemented based on the High-Resolution Network (e.g., HRNetV2 network) which may comprise a general purpose convolutional neural network often used for human pose estimation applications.

In some embodiments, the context extraction functional layer 430 operates to encode long-range context information as contextual features. For example the context extraction functional layer 430 may extract a contextual feature that indicates an association of non-adjacent pixels across the tile image 116, such as an association between pixels that belong to separate dashes of a dashed line lane marking, pixels of different lines of a double line lane marker, or pixels of a lane marking at opposing ends of a tile image 116. Such features may be too far separated to be associated by standard convolutional techniques. In some embodiments, the context extraction functional layer 430 may use attention mechanisms (e.g., self-attention based techniques) that determine contextual interactions between non-adjacent pixels based on attention maps. In some embodiments, the context detection mechanism is implemented using Lambda layers of a LambdaNetwork that capture long-range interactions in data. Further details regarding Lambda layers may be found in Bello, Irwan, "LAMBDANETWORKS: MODELING LONG-RANGE INTERACTIONS WITHOUT ATTENTION," International Conference in Learning Representations 2021, the contents of which are incorporated herein by reference in their entirety. In some embodiments, the context extraction functional layer 420 may apply attention mechanisms and/or lambda layers to dynamically distribute contextual features to produce a contextual features output to the decoder model 450.

The decoder model 450, based on the lane marking landmark segmentation estimates from the multiscale feature extraction functional layer 420 and the contextual features of pixels extracted by the context extraction functional layer 430, may generate a down-sampled prediction comprising the plurality of lane marking heatmap images 122 with individual heatmap images corresponding to one or more of the different road marking characteristics, such as is discussed herein. For individual pixels, the prediction 460 may include heatmap images 122, such as but not limited to a binary classifier for the overall foreground (e.g., lane marking foreground pixels versus unmarked surface background pixels), a multiclass classifier on foreground pixels for lane types classification (e.g., solid line, broken line, single line, and/or double line lane markings), a multiclass classifier on foreground for lane colors classification, and/or a classifier for a lane marking direction (e.g., angle) indication. In some embodiments, the marker direction angle may be predicted by an additional regression layer within the decoder model 450. In some embodiments, the down-sampled prediction of heatmap images 122 may be up-sampled by the decoder model 450 to produce a prediction 460 of lane marking heatmap images 122 that match the dimensional size of the input tile image 116, using bilinear up-sampling operations combined with convolutional layers, for example.

Figure 5:
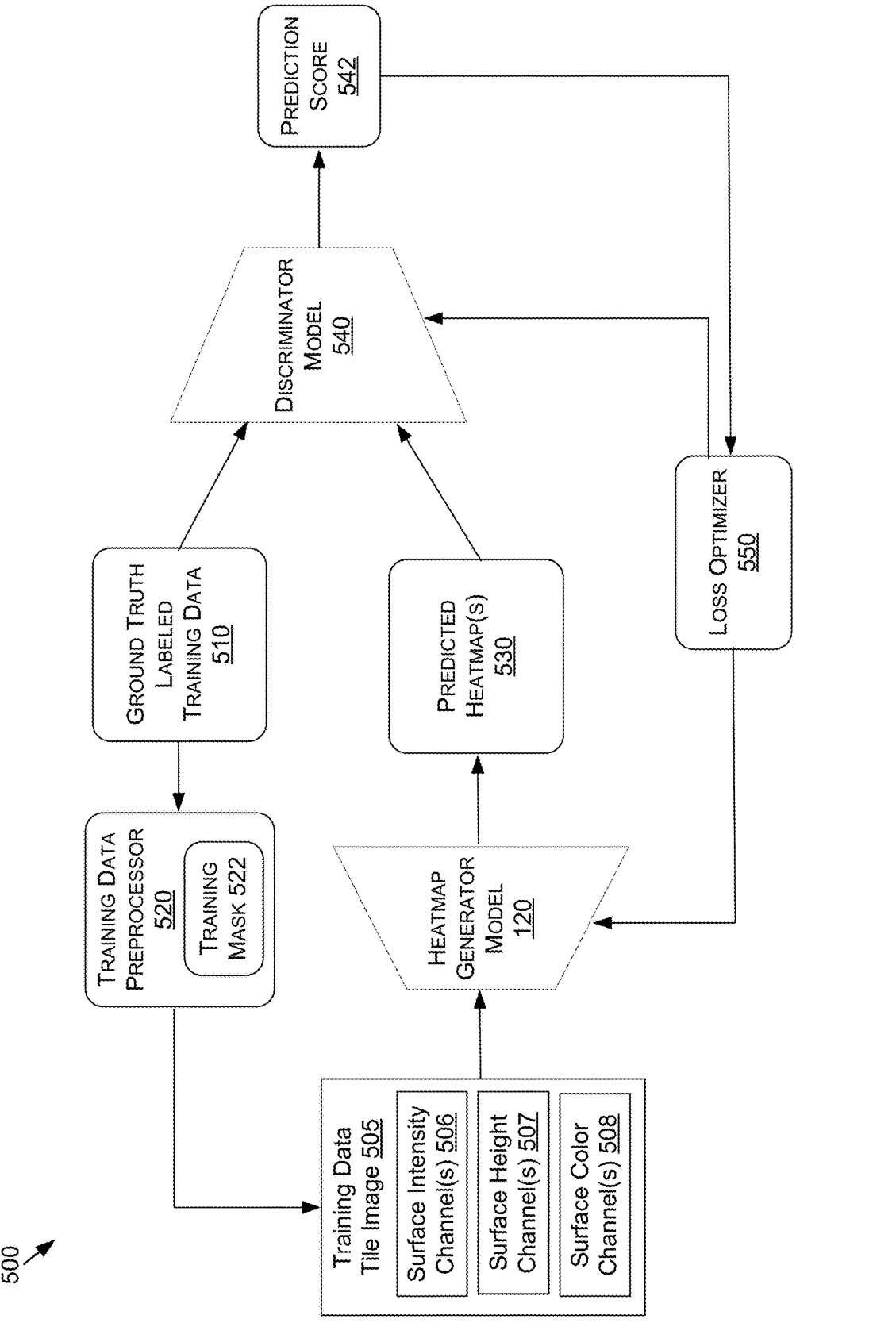
FIG. 5 is a diagram illustrating a generative adversarial network (GAN) training architecture for a heatmap generator model, in accordance with some embodiments of the present disclosure.

Referring now to FIG. 5, FIG. 5 is a diagram illustrating a generative adversarial network (GAN) training architecture 500 for the heatmap generator model 120, in accordance with some embodiments of the present disclosure. As shown in FIG. 5, the heatmap generator model 120 and a discriminator model 540 may engage in a two-play zero-sum task where the heatmap generator model 120 iteratively learns to generate more accurate heatmap image predictions 530 (e.g., using an input training data tile image 518), and the discriminator model 540 iteratively learns to better discern generator model-produced heatmap images 530 from ground truth labeled training data images 510. Training of the heatmap generator model 120 may continue, for example, until the heatmap generator model 120 achieves an optimal heatmap generation quality threshold, and/or the discriminator model 540 can no longer distinguish between a generator model 120-produced heatmap image and a ground truth labeled heatmap image.

As shown in FIG. 5, during training the heatmap generator model 120 inputs a training data time image 505 (e.g., from ground truth labeled training data 510). As previously described with respect to a tile image 116, here the training data time image 505 may comprise surface intensity channel(s) 506 (such as described with respect to surface intensity channels 220), surface intensity channel(s) 507 (such as described with respect to surface height channels 222), and/or surface intensity channel(s) 508 (such as described with respect to surface color channels 224). A training iteration of the heatmap generator model 120 may include processing the training data time image 505 to generate one or more predicted heatmaps 520 (e.g., such as described with respect to lane marking heatmap images 122). The discriminator model 540 evaluates the one or more predicted heatmaps 520 against ground truth labeled training data 510 and attempts to predict which was generated by the heatmap generator model 120. The accuracy of the prediction by the discriminator model 540 may be represented by a prediction score 542 which is used by loss optimizer 500 to adjust the heatmap generator model 120 and/or the discriminator model.

In some embodiments, the discriminator model 540 may comprise a convolutional classifier, such as a PatchGAN classifier. A PatchGAN classifier is a type of discriminator that considers an input as a collection of local image patches and penalizes structure at the scale of those local image patches. For example, the discriminator model 540 implemented using a PatchGAN classifier may attempt to classify one or more N×N pixel local image patches of an image as being either a ground truth image (e.g., an image derived from ground truth labeled training data 510) or as a predicted heatmap image 530 produced by the heatmap generator model 120.

At each training iteration performed with the GAN training architecture 500, a set of one or more loss functions may be computed by the loss optimizer 550, for example based on the prediction score 542. The loss optimizer 550 may compute one or more loss functions such as, but not limited to, a cross-entropy loss, a perceptual loss, an L1 loss, and/or a generative adversarial (GAN) loss. One or more loss feedback signals based on the one or more loss functions may be generated by the loss optimizer 550 to adjust the heatmap generator model 120 and/or the discriminator model 540. Over the course of training iterations performed by the GAN training architecture 500, the heatmap generator model 120 may be adjusted based on the loss feedback signal(s) to attempt to minimize the loss function(s). The discriminator model 540 may be adjusted based on the loss feedback signal(s) to try to maximize the loss function(s).

In some embodiments, data augmentation may be used to augment the ground truth labeled training data 510, including random scaling, random rotation, random color jittering, and/or random cropping. As discussed herein, the dimensions of the image of training data input to the heatmap generator model 120 during training with the GAN training architecture 500 may be different than the dimensions of the tile images input to the heatmap generator model 120 during runtime to predict lane marking heatmap images 122. In some embodiments, the discriminator model 540 may comprise one or more down-sampling blocks (e.g., a four down-sampling block discriminator model), where an individual down-sampling block may include a convolution layer followed by a spectral normalization layer, an instance normalization layer, a leaky rectified linear unit (ReLU) layer, and/or an average pooling layer. In some embodiments, the first down-sampling block may not include the spectral normalization layer. In some embodiments, the final down-sampling block may not include an average pooling layer. The output of the one or more down-sampling blocks may be processed through a convolution layer (e.g., a 1×1 convolution layer) to produce an output of predetermined dimensions.

For example, in some embodiments, a first input to the discriminator model 540 may comprise a 768×768×1-sized predicted heatmap 530 produced by the generator model 120. The third dimension of size "1" may comprise a data channel to convey a confidence of a pixel being a lane marking of the line characteristic for that heatmap image (e.g., an indication of whether the pixel is predicted to be a foreground pixel). A second input to the discriminator model 540 may comprise a 768×768×1-sized ground truth heatmap image corresponding to the line characteristic of the input heatmap image of the first input. These inputs may be processed by the one or more down-sampling blocks of the discriminator model and applied to the convolution layer to produce an output data array of 96×96×1 dimensions. The discriminator model 540 may evaluate the output data array to predict which of the two inputs was generated by the generator model 120. The loss optimizer 550 may compute the one or more loss functions based on whether the prediction of the discriminator model 540 is correct. Using the one or more losses as feedback, the heatmap generator model 120 iteratively learns to generate more accurate heatmap images, and the discriminator model 540 iteratively learns to better discern generator model 120-produced heatmap images from ground truth labeled heatmap images.

In one or more embodiments, training data may be preprocessed by a training data preprocessor 520. For example, occasionally training data may comprise a valid image where one or more ground truth labels for lane markings are missing. Accordingly, in some embodiments, training data preprocessor 520 may generate and apply a training mask 522 that is used with a training image used to train the heatmap generator model 120. The training mask 522 may include within the mask the labeled lane marking features that the generator model 120 is to train on, and excludes from the mask unlabeled lane marking features that the generator model 120 is to ignore during training. As an example, in some embodiments, a first mask may be created for cross-entropy loss using ground truth labels and LIDAR-derived height images. The training data preprocessor 520 may apply a binary dilation method to dilate a labeled ground truth heatmap and create the first mask. Based on defining pixels with a zero height as not belonging to the pathway, the preprocessor 520 uses this information to create a second mask of pixels that do belong to the pathway. The first and second masks are added together to generate the final training mask 522. During training for the cross-entropy loss, back-propagation is limited to pixels that are located within this training mask 522.

Now referring to FIG. 6, FIG. 6 is a flow diagram showing a method 600 for path surface lane marking detection, in accordance with some embodiments of the present disclosure. It should be understood that the features and elements described herein with respect to the method 600 of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa.

Each block of method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the path surface lane marking detection system 100 of FIG. 1. However, these methods may additionally or alternatively be executed by any one system, or any combination of systems, including, but not limited to, those described herein.

As discussed herein in greater detail, the method may include generating at least one heatmap image for at least one road marking characteristic (e.g., a lane marking line characteristic) based on applying at least one tile image of a path surface to a generator model to perform a semantic segmentation to classify pixels of the at least one tile image representing lane markings, the at least one tile image of the path surface based on an orthogonal projection of aggregated path surface data onto a baseline surface representation of the path surface, wherein the aggregated path surface data comprises at least one of LIDAR intensity point-cloud data, LIDAR depth point-cloud data, and path surface color data.

The method 600, at block B602, includes generating at least one tile image of a path surface based at least on an orthogonal projection of aggregated path surface data onto a baseline surface representation of the path surface, the aggregated path surface data obtained based at least on sensor data associated with the path surface. In some embodiments, path surface feature processor 105 may use the projection transform(s) 114 to project the points of the composite point cloud onto a plane corresponding to a plane of the pathway surface. For example, the composite point cloud may include road surface depth data that may be used to establish a baseline surface representation (e.g., a plane) of the pathway surface. The projection transform 114 may be used to generate an orthogonal projection of the points of the composite point cloud onto that baseline surface representation. The projection transform 114 may include a rotation-translation transform to rotate the composite point cloud with respect to the baseline surface representation to produce the top-down view of the baseline surface representation of the segment of the pathway as seen looking down through the composite point cloud. The data provided by individual points may indicate an intensity and/or a depth of a feature on the surface of the pathway that the individual points orthogonally project onto. In some embodiments, projection transform 114 may similarly be used to map pixels of the captured optical image frames to a coordinate system of the baseline surface representation so that a combination of intensity, depth, and color data is obtained for features on the surface of the pathway, as would be observed from a bird's-eye top-down view of the pathway. The segment of the pathway covered by the composite point cloud may be subdivided into portions of the pathway to define a sequence of top-down view tile images, where the data provided by each tile image corresponds to a specific surface area of the pathway.

Aggregated path surface data for at least a segment of a path surface may be received based at least on sensor data depicting the path surface. As discussed herein, a moving platform may travel down a pathway as one or more point cloud sensors and/or one or more optical image sensors capture point-cloud data and/or optical image frames of the path surface. Point cloud data may comprise depth data and/or surface intensity data. The depth data may include depth information for regions of the pathway surface where lane markings have been applied, as well as the unmarked regions of the pathway surface. The height data for the lane markings may be detected based on relative differences between the depth data for the marked and unmarked sections of the pathway surface. The height data may be used by a heatmap generator model for detecting and classifying navigation boundaries and may be used to readily differentiate foreground (lane and/or road marking) pixels versus background (unmarked road surface) pixels. The surface intensity data may indicate the reflectance of the different regions of the pathway. For example, road markings often include embedded reflective particles or are otherwise more reflective than other unmarked sections of a road surface to make them easier to sec.

In some embodiments, image frames of the surface color data and the composite point-cloud data may be time-stamped, or otherwise marked, so that the color data may be correlated with corresponding point-cloud data for the segment of the pathway. The LIDAR-captured data aggregates into a composite point-cloud as the point cloud sensor(s) move so that points of the composite point cloud data corresponding to features of the pathway surface accumulate and build in density both over time and as the surface features become closer to the point cloud sensor(s). The resulting composite point cloud data provides a dense data-set of depth and intensity data that may be combined with the surface color data to produce the aggregated path surface data covering the pathway segment. As such, the aggregated path surface data may comprise at least one of LIDAR intensity point-cloud data, LIDAR depth point-cloud data, and path surface color data. The aggregated path surface data may comprise at least a composite point-cloud of LIDAR data captured from at least one sensor on a moving platform positioned at a plurality of locations along the segment of the path surface. In some embodiments, the aggregated path surface data further comprises location data (e.g., navigation data) indicating a position of where the sensor data was captured. Navigation data, such as satellite navigation data (e.g., Global Positioning System (GPS) data) and/or Real Time Kinematics (RTK) data, may be captured as the LIDAR and/or camera image frames are captured and used to correlate and map the position of a tile image and/or the heatmap images for that tile image to geographic locations. In this way, in some embodiments, heatmap images may be mapped to segments of the real-world pathway to represent characteristics of road markings appearing on the surface of those pathway segments.

The method 600, at block B604, includes applying the at least one tile image to a generator model to perform a semantic segmentation of the at least one tile image that classifies one or more pixels of the at least one tile image based at least on one or more road marking characteristics. In some embodiments the generator model may comprise an encoder model and decoder model, such as that illustrated in FIG. 4. The encoder model of the generator model may be used to down-sample the at least one tile image into a multiscale image representation comprising a plurality of resolution layers. In some embodiments, a multiscale feature extraction function layer of the generator model may perform one or more multiscale feature extractions to estimate one or more segmentations of road marking landmarks from the plurality of resolution layers. The decoder model of the generator model may be used to up-sample the one or more segmentations of road marking landmarks to generate the at least one heatmap image. In some embodiments, the generator model may include a context extraction functional layer of the generator model that may be used to extract one or more contextual features that indicate at least one contextual association between the one or more segmentations of road marking landmarks. The context extraction functional layer may determine the at least one contextual association using at least one attention mechanism based on one or more attention maps and/or determine the at least one contextual association using one or more Lambda layers of a LambdaNetwork. In some embodiments, the generator model may be trained using a feedback comprising at least one loss determined by a discriminator model based on a generative adversarial network (GAN) training architecture. The at least one loss may be computed based on a first input comprising the at least one heatmap image and a second input comprising at least one ground truth labeled heatmap image. In some embodiments, the method may include generating at least one training mask based at least on the at least one ground truth labeled heatmap image and training the generator model based at least on road marking features of a training data image located within the at least one training mask.

The method 600, at block B606, includes, generating at least one heatmap image based at least on the one or more pixels of the at least one tile image classified as representing the one or more road marking characteristics. One or more pixels of the at least one heatmap image may represent road marking locations for the road marking characteristic comprising at least one of, but not limited to, a solid line lane marking, a broken line lane marking, a white line lane marking, or a yellow line lane marking. In some embodiments, the at least one heatmap image may include an indication of a line marking angle for at least one lane marking. The method may including generating a map of the path surface based at least on the at least one heatmap image.

The systems and methods described herein may be used by and/or in conjunction with, without limitation, non-autonomous vehicles, semi-autonomous vehicles (e.g., in one or more adaptive driver assistance systems (ADAS)), piloted and un-piloted robots or robotic platforms, ware-house vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing generative AI operations using a language model-such as a large language model (LLM), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 7A:
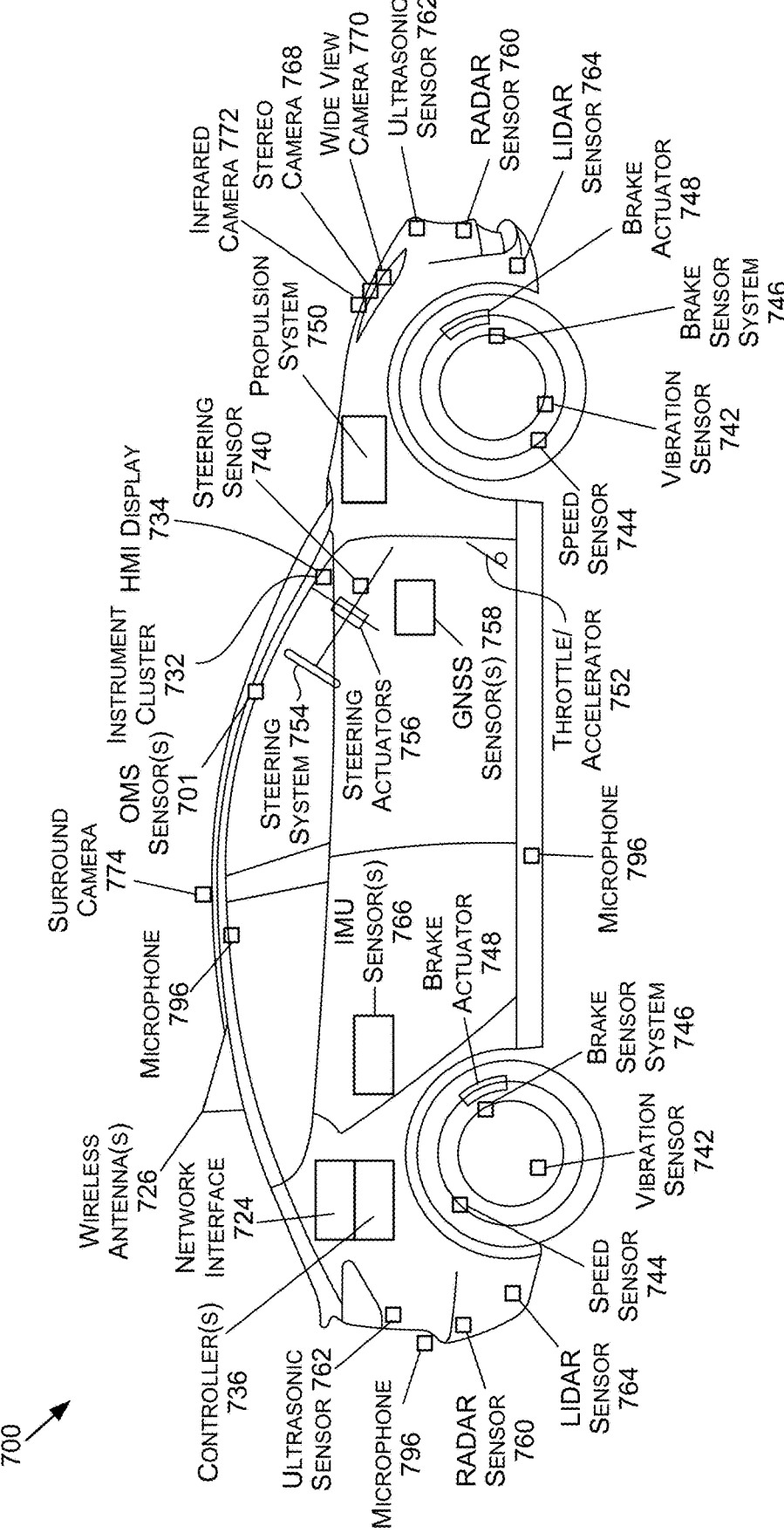
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), one or more occupant monitoring system (OMS) sensor(s) 701 (e.g., one or more interior cameras), and/or other sensor types. In some embodiments, the controller(s) 736 may provide the signals for controlling one or more components and/or systems of the vehicle 700 based on lane marking heatmap images 122 generated by heatmap generator model 120, and/or other maps derived at least in part from lane marking heatmap images 122.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
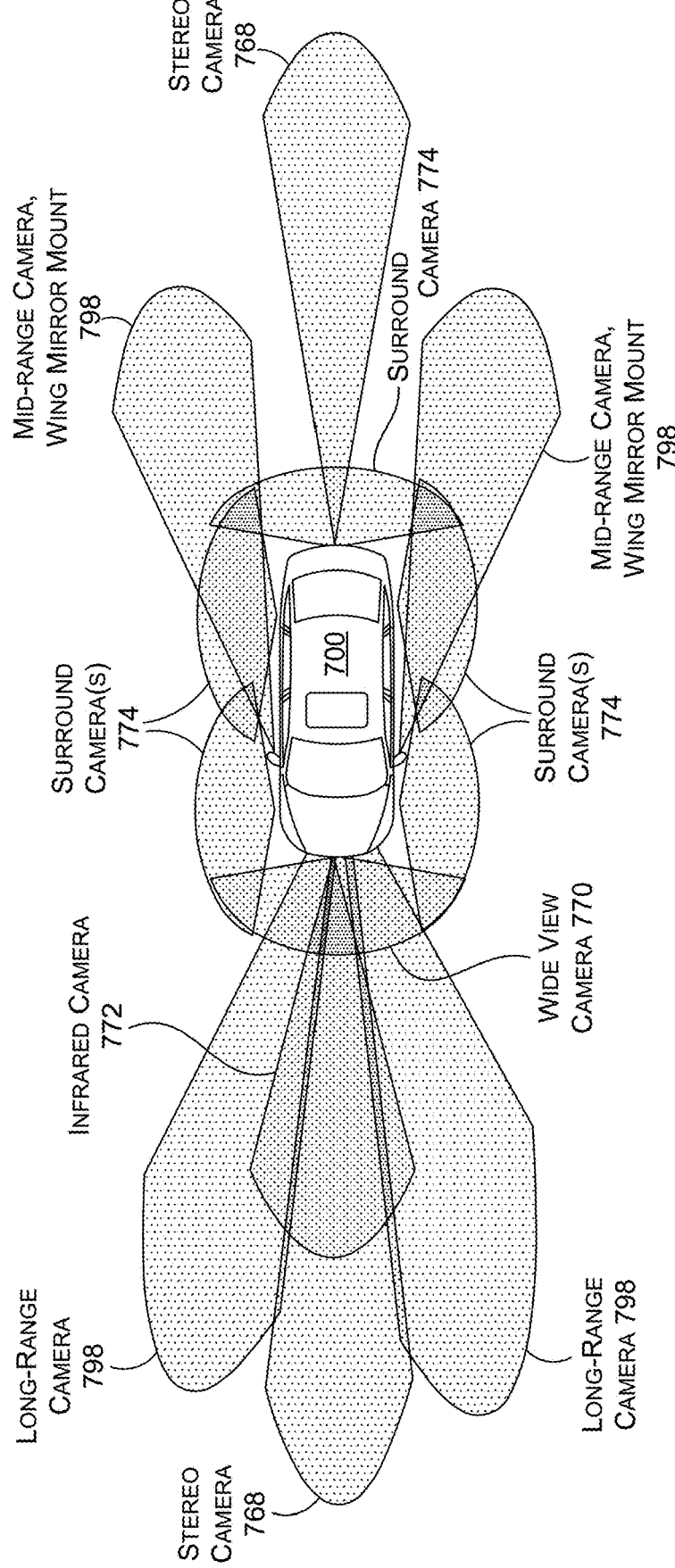
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700. In some embodiments, point cloud sensor(s) 106 and/or optical image sensors 110 may be implemented using one or more of the sensors and/or cameras of FIGS. 7A and 7B.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear (RCCC) color filter array, a red clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Cameras with a field of view that include portions of the interior environment within the cabin of the vehicle 700 (e.g., one or more OMS sensor(s) 701) may be used as part of an occupant monitoring system (OMS) such as, but not limited to, a driver monitoring system (DMS). For example, OMS sensors (e.g., the OMS sensor(s) 701) may be used (e.g., by the controller(s) 736) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle).

Figure 7C:
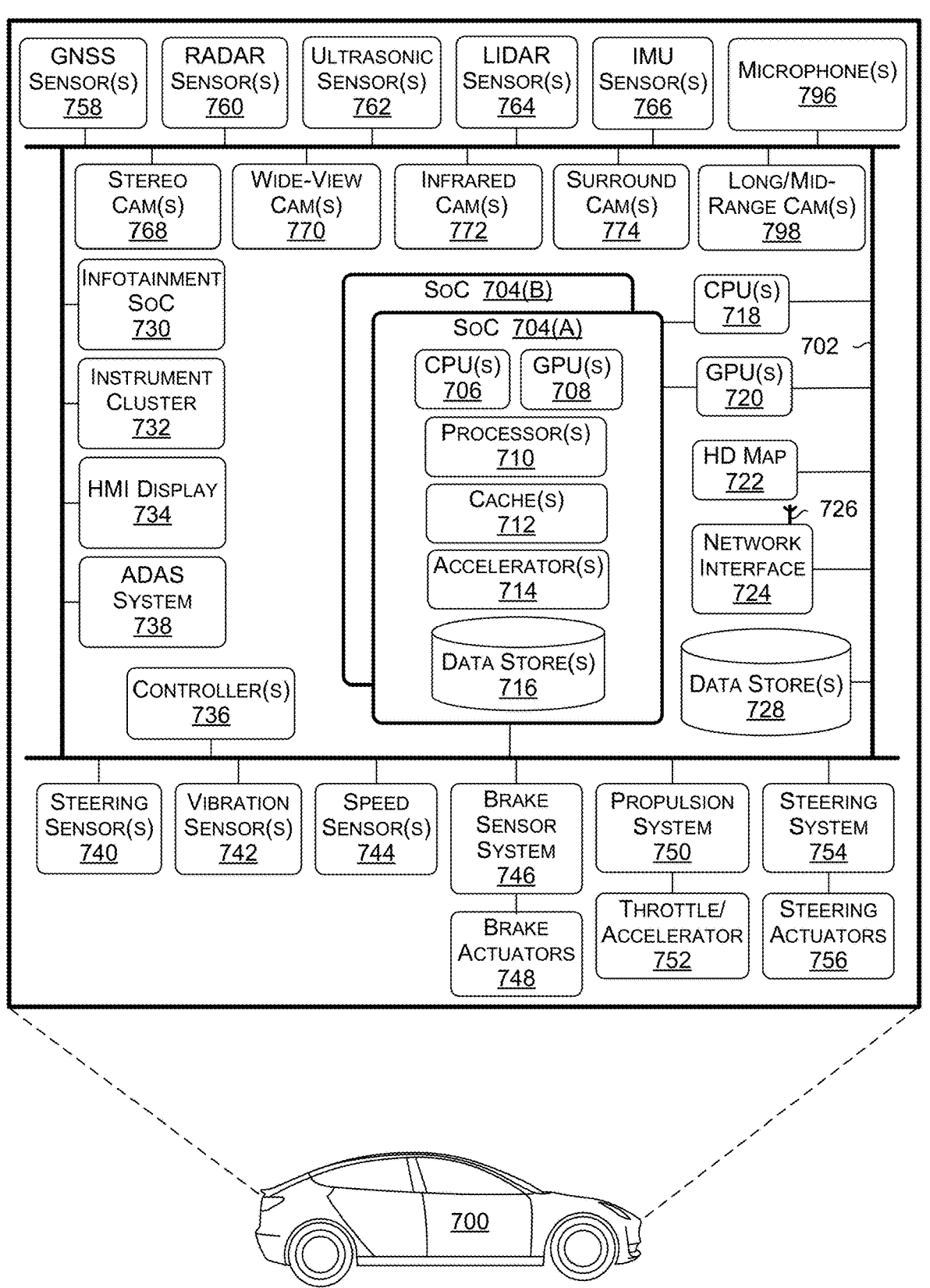
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D). In some embodiments, one or more components of an SoC 704 may execute one or more elements of the path surface feature processor 105 described herein. For example, a heatmap generator model 120 may be executed by at least one GPU 708 to generate one or more lane marking heatmap images 122.

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 716 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's info-tainment system and settings, or provide voice-activated web surfing. Certain functions are available to the driver only when the vehicle is operating in an autonomous mode, and are disabled otherwise.

The video image compositor may include enhanced tem-poral noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image com-positor may be used to offload the GPU(s) 708 to improve performance and responsiveness.

The SoC(s) 704 may further include a mobile industry processor interface (MIPI) camera serial interface for receiv-ing video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with periph-erals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass stor-age controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety archi-tecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and function-ality that cannot be achieved by conventional systems. For example, computer vision algorithms may be executed on CPUS, which may be configured using high-level program-ming language, such as the C programming language, to execute a wide variety of processing algorithms across a wide variety of visual data. However, CPUs are oftentimes unable to meet the performance requirements of many computer vision applications, such as those related to execu-tion time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration clus-ter, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Com-plex) that when flashing lights are detected, icy conditions exist. The flashing light may be identified by operating a third deployed neural network over multiple frames, inform-ing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detec-tion and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
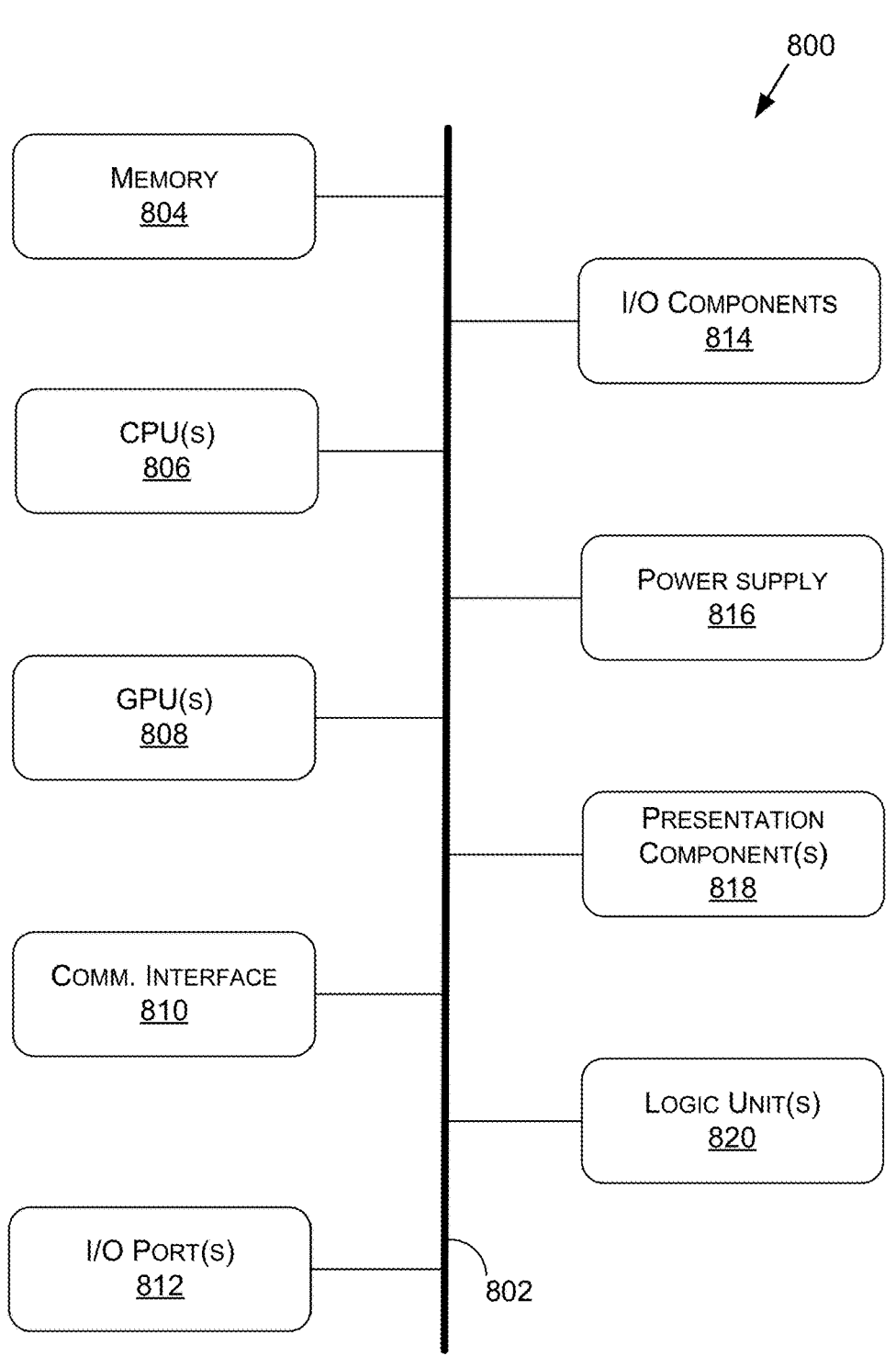
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof. In some embodiments, CPUs 806 and/or GPUs 808 may execute one or more elements of the path surface feature processor 105 described herein, such as but not limited to the heatmap generator model 120.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
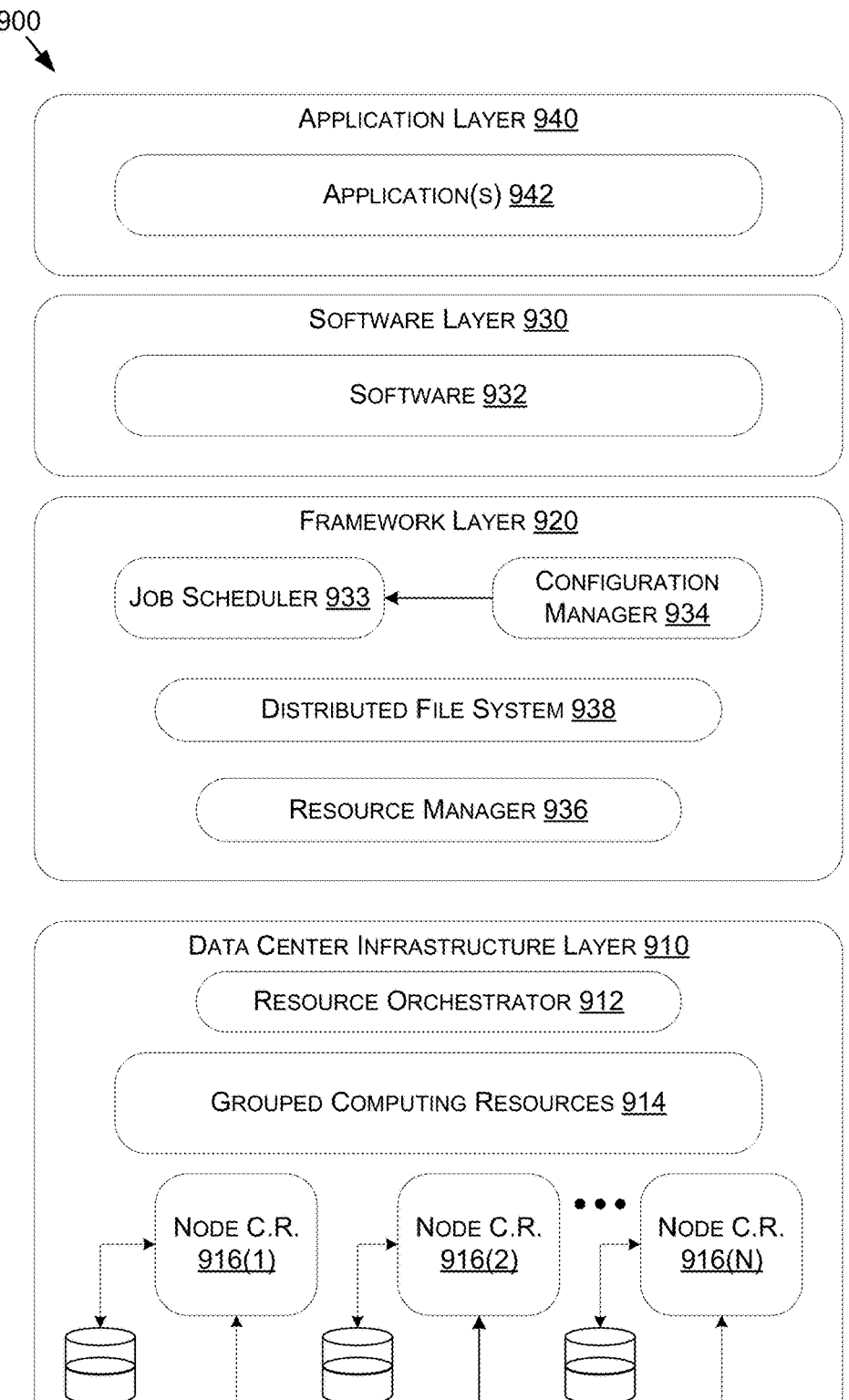
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916 (N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM). In some embodiments, one or more of the C.R.s 916(1)-916 (N) may execute one or more elements of the path surface feature processor 105 described herein, such as but not limited to the heatmap generator model 120.

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916 (N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment- and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

one or more processing units to:

generate at least one tile image of a path surface based at least on an orthogonal projection of aggregated path surface data onto a baseline surface representation of the path surface, the aggregated path surface data obtained based at least on sensor data associated with the path surface;

apply the at least one tile image to a generator model to perform a semantic segmentation of the at least one tile image that classifies one or more pixels of the at least one tile image based at least on one or more road marking characteristics; and generate, based at least on the one or more pixels of the at least one tile image classified as representing the one or more road marking characteristics, at least one heatmap image, individual pixels of the at least one heatmap image including a data channel that includes a confidence value computed using the generator model, and the confidence value indicating a confidence in predicted classifications of individual pixels of the one or more pixels of the at least one tile image.

2. The system of claim 1, wherein the aggregated path surface data comprises at least one of LIDAR intensity point-cloud data, LIDAR depth point-cloud data, or path surface color data.

3. The system of claim 1, wherein the aggregated path surface data comprises at least a composite point-cloud of LIDAR data captured from at least one sensor on a moving platform positioned at a plurality of locations along a segment of the path surface.

4. The system of claim 1, wherein the aggregated path surface data further comprises location data indicating a position of where the sensor data was captured.

5. The system of claim 1, wherein the one or more processing units are further to:

with an encoder model of the generator model, down-sample the at least one tile image into a multiscale image representation comprising a plurality of resolution layers;

with a multiscale feature extraction function layer of the generator model, perform one or more multiscale feature extractions to estimate one or more segmentations of road marking landmarks from the plurality of resolution layers; and with a decoder model of the generator model, up-sample the one or more segmentations of road marking landmarks to generate the at least one heatmap image.

6. The system of claim 5, wherein the one or more processing units are further to:

with a context extraction functional layer of the generator model, extract one or more contextual features that indicate at least one contextual association between the one or more segmentations of road marking landmarks.

7. The system of claim 6, wherein the context extraction functional layer determines the at least one contextual association using at least one attention mechanism based on one or more attention maps.

8. The system of claim 6, wherein the context extraction functional layer determines the at least one contextual association using one or more Lambda layers of a LambdaNetwork.

9. The system of claim 1, wherein the one or more processing units are further to:

train the generator model using a feedback comprising at least one loss determined using a discriminator model based on a generative adversarial network (GAN) training architecture; and compute the at least one loss based on a first input comprising at least one training heatmap image and a second input comprising at least one ground truth labeled heatmap image.

10. The system of claim 9, wherein the one or more processing units are further to:

generate at least one training mask based at least on the at least one ground truth labeled heatmap image; and train the generator model based at least on road marking features of a training data image located within the at least one training mask.

11. The system of claim 1, wherein one or more pixels of the at least one heatmap image represent one or more road marking locations for the one or more road marking characteristics comprise at least one of:

a solid line lane marking, a broken line lane marking, a white line lane marking, or a yellow line lane marking.

12. The system of claim 1, wherein the at least one heatmap image includes an indication of a line marking angle for at least one lane marking.

13. The system of claim 1, wherein the one or more processing units are further to:

generate a map of the path surface based at least on the at least one heatmap image.

14. The system of claim 1, wherein the one or more processing units are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for generating synthetic data;

a system incorporating one or more virtual machines (VMs);

a system implemented at least partially in a data center;

a system for performing generative AI operations;

a system implemented at least partially using a language model; or a system implemented at least partially using cloud computing resources.

15. At least one processor comprising:

one or more processing units to cause a machine to perform one or more planning, navigation, or control operations using a map, the map generated at least by:

generate at least one tile image of a path surface based at least on an orthogonal projection of aggregated path surface data onto a baseline surface representation of the path surface, the aggregated path surface data comprising at least one of LIDAR intensity point-cloud data, LIDAR depth point-cloud data, or path surface color data;

apply the at least one tile image to a generator model to perform a semantic segmentation of the at least one tile image to classify pixels of the at least one tile image based at least on a road marking characteristic;

generate at least one heatmap image for at least one road marking characteristic based at least on the pixels of the at least one tile image classified as representing road markings, individual pixels of the at least one heatmap image including a data channel that includes a confidence value computed using the generator model, and the confidence value indicating a confidence in predicted classifications of individual pixels of the pixels of the at least one tile image; and use the at least one heatmap image to encode information about the road markings in the map.

16. The at least one processor of claim 15, wherein the map is further generated by:

with an encoder model of the generator model, down-sample the at least one tile image into a multiscale image representation comprising a plurality of resolution layers;

with a multiscale feature extraction function layer of the generator model, perform one or more multiscale feature extractions to estimate one or more segmentations of road marking landmarks from the plurality of resolution layers;

with a context extraction functional layer of the generator model, extract one or more contextual features that indicate at least one contextual association between the one or more segmentations of road marking landmarks; and with a decoder model of the generator model, up-sample the one or more segmentations of road marking landmarks to generate the at least one heatmap image.

17. The at least one processor of claim 15, wherein the aggregated path surface data comprises at least a composite point-cloud of LIDAR data captured from at least one sensor on a moving platform positioned at a plurality of locations along at least a segment of the path surface.

18. The at least one processor of claim 15, wherein one or more pixels of the at least one heatmap image represent road marking locations for the road marking characteristic comprising at least one of: a solid line lane marking, a broken line lane marking, a white line lane marking, a yellow line lane marking; and wherein the at least one heatmap image includes an indication of a road marking angle for at least one road marking.

19. The at least one processor of claim 15, wherein the one or more processing units are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for three-dimensional assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for generating synthetic data;

a system incorporating one or more virtual machines (VMs);

a system implemented at least partially in a data center;

a system for performing generative AI operations;

a system implemented at least partially using a language model; or a system implemented at least partially using cloud computing resources.

20. A method comprising:

generating at least one heatmap image for at least one lane marking line characteristic based at least on applying at least one tile image of a path surface to a generator model to perform a semantic segmentation to classify pixels of the at least one tile image, individual pixels of the at least one heatmap image including a data channel that includes a confidence value computed using the generator model, and the confidence value indicating a confidence in predicted classifications of individual pixels of the at least one tile image, the at least one tile image of the path surface based on an orthogonal projection of aggregated path surface data onto a baseline surface representation of the path surface, the aggregated path surface data comprising at least one of LIDAR intensity point-cloud data, LIDAR depth point-cloud data, or path surface color data.

\* \* \* \* \*